US00RE47643E

(19) United States
(12) Reissued Patent
Suumäki et al.

(10) Patent Number: US RE47,643 E
(45) Date of Reissued Patent: Oct. 8, 2019

(54) METHOD, APPARATUS AND COMPUTER PROGRAM PRODUCT FOR CREATING A WIRELESS DOCKING GROUP

(71) Applicant: III HOLDINGS 3, LLC, Wilmington, DE (US)

(72) Inventors: Jan Suumäki, Lempäälä (FI); Mika Saaranen, Pirkkala (FI); Tuomas Laine, Vantaa (FI)

(73) Assignee: III HOLDINGS 3, LLC., Wilmington, DE (US)

(21) Appl. No.: 14/877,563

(22) Filed: Oct. 7, 2015

Related U.S. Patent Documents

Reissue of:
(64) Patent No.: 8,554,970
Issued: Oct. 8, 2013
Appl. No.: 13/088,621
Filed: Apr. 18, 2011

(51) Int. Cl.

| | |
|---|---|
| ***G06F 13/00*** | (2006.01) |
| ***H04W 76/14*** | (2018.01) |
| ***H04W 4/80*** | (2018.01) |
| ***H04W 4/08*** | (2009.01) |
| *H04W 8/22* | (2009.01) |
| *H04W 76/23* | (2018.01) |
| *H04W 88/04* | (2009.01) |

(52) U.S. Cl.
CPC ..... *H04W 76/14* (2018.02); *H04W 4/08* (2013.01); *H04W 4/80* (2018.02); *H04W 8/22* (2013.01); *H04W 76/23* (2018.02); *H04W 88/04* (2013.01)

(58) Field of Classification Search
CPC ..... H04W 4/008; H04W 4/08; H04W 76/023; H04W 76/043; H04W 8/22; H04W 88/04
USPC ..... 710/303; 370/338, 463
See application file for complete search history.

(56) References Cited

U.S. PATENT DOCUMENTS

| | | | |
|---|---|---|---|
| 5,530,702 | A | 6/1996 | Palmer et al. |
| 5,842,210 | A | 11/1998 | Chen et al. |
| 6,757,531 | B1 | 6/2004 | Haaramo et al. |
| 6,816,063 | B2 | 11/2004 | Kubler et al. |
| 6,888,354 | B1 | 5/2005 | Gofman |

(Continued)

FOREIGN PATENT DOCUMENTS

| | | |
|---|---|---|
| EP | 1630712 | 1/2006 |
| EP | 1 630 712 | 3/2006 |

(Continued)

OTHER PUBLICATIONS

"Wi-Fi Certified.TM. for Wi-Fi Protected Setup.TM. : Easing the User Experience for Home and Small Office Wi-Fi.RTM. Networks", 2007, 2008, 2009 Wi-Fi Allicance. pp. 1-14.

(Continued)

*Primary Examiner* — Majid A Banankhah
(74) *Attorney, Agent, or Firm* — Foley & Lardner LLP; Paul S. Hunter

(57) ABSTRACT

Method, apparatus, and computer program product embodiments are disclosed to enable simplified configuring of a wireless docking group for wireless devices by allowing a wireless device to communicate its capabilities and characteristics of one or more wireless devices within a wireless docking group, using a new Wireless Docking Protocol, to a wireless docking station that will use that information and the Wireless Docking Protocol to define an optimal set of connections for wireless devices in the wireless docking group.

23 Claims, 19 Drawing Sheets

(56) References Cited

U.S. PATENT DOCUMENTS

| | | | | |
|---|---|---|---|---|
| 6,892,052 | B2 | 5/2005 | Kotola et al. | |
| 7,069,312 | B2 | 6/2006 | Kostic et al. | |
| 7,075,412 | B1 | 7/2006 | Reynolds et al. | |
| 7,190,981 | B2 | 3/2007 | Cherian | |
| 7,471,200 | B2 | 12/2008 | Otranen | |
| 7,519,682 | B2 | 4/2009 | Smith et al. | |
| 7,590,075 | B2 * | 9/2009 | Pirzada | H04N 21/4126 370/254 |
| 7,701,958 | B2 | 4/2010 | Abrol et al. | |
| 7,775,432 | B2 | 8/2010 | Jalkanen et al. | |
| 7,821,399 | B2 | 10/2010 | Otranen | |
| 8,210,433 | B2 | 7/2012 | Jalkanen et al. | |
| 2001/0045460 | A1 | 11/2001 | Reynolds et al. | |
| 2002/0012329 | A1 | 1/2002 | Atkinson et al. | |
| 2002/0021809 | A1 | 2/2002 | Salo et al. | |
| 2002/0022961 | A1 | 2/2002 | Sepanaho | |
| 2002/0023264 | A1 | 2/2002 | Aaltonen et al. | |
| 2002/0069406 | A1 | 6/2002 | Aaltonen et al. | |
| 2002/0087997 | A1 | 7/2002 | Dahlstrom | |
| 2002/0191998 | A1 | 12/2002 | Cremon et al. | |
| 2003/0043041 | A1 | 3/2003 | Zeps et al. | |
| 2003/0084177 | A1 | 5/2003 | Mulligan | |
| 2003/0097304 | A1 | 5/2003 | Hunt | |
| 2003/0120745 | A1 | 6/2003 | Katagishi et al. | |
| 2003/0134653 | A1 | 7/2003 | Sarkkinen et al. | |
| 2004/0193676 | A1 | 9/2004 | Marks | |
| 2004/0203413 | A1 | 10/2004 | Harumoto | |
| 2004/0225199 | A1 | 11/2004 | Evanyk et al. | |
| 2006/0003768 | A1 | 1/2006 | Chiou | |
| 2007/0001853 | A1 | 1/2007 | Otranen | |
| 2007/0123316 | A1 | 5/2007 | Little | |
| 2007/0168440 | A1 | 7/2007 | Cobelens | |
| 2008/0141347 | A1 * | 6/2008 | Kostiainen | H04L 9/32 726/4 |
| 2008/0146151 | A1 | 6/2008 | Lyu et al. | |
| 2008/0195788 | A1 | 8/2008 | Tamir et al. | |
| 2008/0248751 | A1 | 10/2008 | Pirzada et al. | |
| 2008/0253331 | A1 | 10/2008 | Gupta et al. | |
| 2009/0197604 | A1 | 8/2009 | Gupta et al. | |
| 2009/0222659 | A1 | 9/2009 | Miyabayashi et al. | |
| 2009/0227282 | A1 | 9/2009 | Miyabayashi et al. | |
| 2009/0271519 | A1 | 10/2009 | Helvick | |
| 2009/0271709 | A1 * | 10/2009 | Jin | H04L 63/20 715/739 |
| 2009/0276439 | A1 | 11/2009 | Rosenblatt et al. | |
| 2010/0040007 | A1 * | 2/2010 | Itagaki | H04L 47/10 370/329 |
| 2010/0056123 | A1 | 3/2010 | Julian et al. | |
| 2010/0057969 | A1 | 3/2010 | Meiri et al. | |
| 2010/0165879 | A1 * | 7/2010 | Gupta | H04L 12/2807 370/254 |
| 2010/0197224 | A1 | 8/2010 | Lahdenniemi et al. | |
| 2010/0211785 | A1 | 8/2010 | Park et al. | |
| 2010/0260069 | A1 | 10/2010 | Sakamoto et al. | |
| 2011/0034127 | A1 * | 2/2011 | Wentink | H04W 76/022 455/41.2 |
| 2011/0092155 | A1 * | 4/2011 | Piemonte | H04M 1/7253 455/41.1 |
| 2012/0057577 | A1 * | 3/2012 | Dwivedi et al. | 370/338 |
| 2012/0099566 | A1 | 4/2012 | Laine et al. | |
| 2012/0100803 | A1 | 4/2012 | Suumaki et al. | |
| 2012/0155643 | A1 * | 6/2012 | Hassan et al. | 380/270 |
| 2012/0169473 | A1 | 7/2012 | Jalkanen et al. | |
| 2013/0016032 | A1 * | 1/2013 | Margulis | 345/2.3 |
| 2013/0036231 | A1 | 2/2013 | Suumaki | |

FOREIGN PATENT DOCUMENTS

| | | | |
|---|---|---|---|
| EP | 1 633 104 | | 3/2006 |
| EP | 1633104 | | 8/2006 |
| WO | WO-00/67221 | | 11/2000 |
| WO | 01/45319 | A1 | 6/2001 |
| WO | WO-01/45319 | | 6/2001 |
| WO | 01/52179 | A2 | 7/2001 |
| WO | WO-01/52179 | | 7/2001 |
| WO | 02/11074 | A2 | 2/2002 |
| WO | WO-02/11074 | | 2/2002 |
| WO | 2006/106393 | A2 | 10/2006 |
| WO | WO-2006/106393 | | 10/2006 |
| WO | WO-2006/130063 | | 12/2006 |
| WO | 2007/001629 | A2 | 1/2007 |
| WO | WO-2007/001629 | | 1/2007 |

OTHER PUBLICATIONS

International Search Report and Written Opinion dated Oct. 19, 2012 for International Application Serial No. PCT/FI2012/050577, 14 pp.

NFC Activity Specification Candidate Technical Specification, NFC ForumTM, NFCForum-TS Activity-1.0.sub.--Candidate-11, Mar. 12, 2010, 118 pp.

NFC Forum Connection Handover Technical Specification NFC Forum TM Connection handover 1.1 NFCForum-TS-ConnectionHandover.sub.--1.1, Nov. 6, 2008, 43 pp.

NFC Forum; Connection Handover; Technical Specification NFC Forum TM: Connection Handover 1.2; NFCForum-TS-ConnectionHandover.sub.--1.sub.--2.doc; Jul. 7, 2010, 27 pp.

NFC Forum; Logical Link Control Protocol; Technical Specification NFC Forum TM; LLCP 1.0, NFCForum-TS-LLCP 1.0: NFCForum-TS-LLCP.sub.--1.0; Dec. 11, 2009, 45 pp.

NFC Forum; NFC Data Exchange Format (NDEF) Technical Specification: NFC Forum TM; NDEF 1.0; NFCForum-TS-NDEF.sub.--1.0; Jul. 24, 2006, 25 pp.

Non-Final Office Action issued on U.S. Appl. No. 13/088,621, dated May 21, 2013.

Notice and Filing of Opposition in European Patent 1 685 689, 11 pp. with Reply to Notice of Opposition in European Patent 1 685 689, 11 pp.

Notice of Allowance on U.S. Appl. No. 13/088,621, dated Jul. 29, 2013.

Wi-Fi Peer-to-Peer (P2P) Technical Specification, Wi-Fi Alliance Technical Committee P2P Task Group, Version 1.1, 2010 Wi-Fi Alliance, 159 pp.

NFC Digital Protocol Candidate Technical Specification, NFC Forum TM, NFCForum-TS-Digital Protocol, Apr. 3, 2009, 186 pp.

WiFi Allicance, Wi-Fi Protected Setup Specification Version 1.0h; Dec. 2006, 110 pp.

WiFi Allicance, WiFi Configuration Specification Version 2.0 r42 unofficial draft-01; Feb. 9, 2010, 156 pp.

Wi-Fi Simple Configuration Technical Specification, Version 2.0, 2010 Wi-Fi Allicance, 154 pp.

Radio Frequency Identification RFID—A basic primer; AIM Inc. White Paper; Aug. 23, 2001, the Association of the Automatic Identification and Data Capture Industry (AIM Inc.); WP-98/002R2, 17 pp.

Reply to Notice of Opposition in European Patent 1 685 689, 11 pp.

Office Action for Korean Application No. 10-2006-7009441 dated Apr. 23, 2007.

Notice of Allowance for Korean Application No. 10-2006-7009441 dated Jan. 7, 2008.

International Search Report dated Jul. 20, 2011 for PCT International Application No. PCT/FI2011/050281.

U.S. Appl. No. 12/908,037, filed Oct. 20, 2010, Suumäki et al.

U.S. Appl. No. 12/908,028, filed Oct. 20, 2010, Laine et al.

U.S. Appl. No. 13/198,984, filed Aug. 10, 2011, Suumäki et al.

J. Suomalainen et el., "Standards for Security Associations in Personal Networks: A Comparative Analysis", International Journal of Security and Networks, vol. 4, Nos. 1-2, 2009, pp. 87-100.

Wu, et al., "An Ubiquitous Data Delivery System in Hybrid Wireless Environments", Proceedings of the 2010 International Conference on P2P, Parallel, Grid, Cloud and Internet Computing, 2010, pp. 230-234.

European Search Report for EP Application No. 08006467.8-2412 / 1965555 dated Nov. 2, 2011.

International Search Report and Written Opinion mailed Oct. 19, 2012 for International Application Serial No. PCT/FI2012/050577, 14 pp.

(56) References Cited

OTHER PUBLICATIONS

Widmer, Peter, "Smart Box Software Framework," Vision Document, Jul. 4, 2003, 23pp.
European Search Report dated Jan. 27, 2012 for Application No. EP 11181733.4-2412.

* cited by examiner

SCENARIO 1

SCENARIO 1'

SCENARIO 2

SCENARIO 3

SCENARIO 4

SCENARIO 5

SCENARIO 6

WIRELESS DOCKING PROTOCOL 142

WIRELESS DOCKING PROTOCOL

WIRELESS DOCKING PROTOCOL

WIRELESS DOCKING PROTOCOL

WIRELESS DOCKING PROTOCOL

WIRELESS DOCKING PROTOCOL IN THE DOCKEE DEVICE

METHOD, APPARATUS AND COMPUTER PROGRAM PRODUCT FOR CREATING A WIRELESS DOCKING GROUP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application is a reissue application of U.S. application Ser. No. 13/088,621, filed Apr. 18, 2011, now U.S. Pat. No. 8,554,970, issued Oct. 8, 2013, incorporated herein by reference in its entirety.*

FIELD

The field of the invention relates to wireless communication, and more particularly to creating a wireless docking group within a wireless environment.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wideband (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

Traditionally, docking station hardware has been used to plug in a laptop computer for use as a desktop computer, and to directly connect it with peripherals such as a monitor, keyboard, and other common peripherals. Currently there are no standards for configuring an entire wireless docking environment. An individual peripheral may be wirelessly connected to a mobile device by means of manual or semi-automatic configuration. However, manually configuring a mobile device with multiple peripherals in a wireless docking environment, including wireless device discovery, selection, and connectivity setup, is a cumbersome task requiring technical expertise and may generally the result in a less than optimal wireless connectivity between the devices.

SUMMARY

Method, apparatus, and computer program product embodiments are disclosed to enable simplified configuring of a wireless docking group for wireless devices by allowing a wireless device to communicate its capabilities and characteristics of one or more wireless devices within a wireless docking group, using a new Wireless Docking Protocol to a wireless docking station that will use that information and the Wireless Docking Protocol to define an optimal set of connections for wireless devices in the wireless docking group.

An example embodiment of the invention includes a method comprising the steps of forming a communication link between a wireless docking station and a dockee device;

receiving, by the docking station, from the dockee device, information about the dockee device's capabilities and characteristics of one or more wireless devices within a wireless docking group;

defining, by the docking station, one or more optimal connections for one or more of the wireless devices in the wireless docking group, based on the received information; and transmitting, by the docking station, to the dockee device, information to enable formation of the one or more optimal connections for the one or more devices in the wireless docking group.

An example embodiment of the invention further comprises a method for wireless docking, wherein the information is communicated using a docking protocol.

An example embodiment of the invention further comprises a method for wireless docking, wherein the wireless docking station joins an infrastructure network having an access point, and forms a peer-to-peer connection with the dockee device.

An example embodiment of the invention further comprises a method for wireless docking, by forming direct connections by the wireless docking station, with at least one of the one or more devices, based on the defined optimal connections.

An example embodiment of the invention further comprises a method for wireless docking, wherein the communication link with the dockee device is a Wi-Fi direct network.

An example embodiment of the invention further comprises a method for wireless docking, wherein the communication link with the dockee device is a Tunneled Direct Link Setup connection.

In an example embodiment of the invention, a computer program product comprising computer executable program code recorded on a computer readable, non-transitory storage medium, the computer executable program code, when executed by a computer processor, performing the steps in the example methods recited above.

In an example embodiment of the invention, an apparatus, comprises:

at least one processor;

at least one memory including computer program code;

the at least one memory and the computer program code configured to, with the at least one processor, cause the device at least to:

form a communication link with a dockee device;

receive from the dockee device, information about the dockee device's capabilities and characteristics of one or more wireless devices within a wireless docking group;

define one or more optimal connections for one or more of the wireless devices in the wireless docking group, based on the received information; and transmit to the dockee device, information to enable formation of the one or more optimal connections for the one or more devices in the wireless docking group.

An example embodiment of the invention includes a method comprising the steps of forming a communication link between a wireless docking station and a dockee device;

transmitting, by the dockee device to the docking station, information about the dockee device's capabilities and characteristics of one or more wireless devices within a wireless docking group; and receiving, by the dockee device from the docking station, information to enable formation of the one or more optimal connections for the one or more devices in the wireless docking group.

An example embodiment of the invention further comprises a method for wireless docking, wherein the information is communicated using a docking protocol.

An example embodiment of the invention wherein the method further comprises forming, by the dockee device, one or more wireless connections with one or more other devices based on the received information.

In an example embodiment of the invention, a computer program product comprising computer executable program code recorded on a computer readable, non-transitory storage medium, the computer executable program code, when executed by a computer processor, performing the steps in the example methods recited above.

In an example embodiment of the invention, an apparatus, comprises:

at least one processor;

at least one memory including computer program code;

the at least one memory and the computer program code configured to, with the at least one processor, cause the device at least to:

form a communication link between the apparatus and a wireless docking station;

transmit to the docking station, information about the apparatus' capabilities and characteristics of one or more wireless devices within a wireless docking group; and receive from the docking station, information to enable formation of the one or more optimal connections for the one or more devices in the wireless docking group.

The resulting example embodiments enable simplified configuring of a wireless docking environment for wireless devices, a consistent and easier user experience, fewer steps for a user to setup Wi-Fi connectivity, no need for a user to understand the details of Wi-Fi connection setup, and more optimal Wi-Fi connectivity settings.

DISCUSSION OF EXAMPLE EMBODIMENTS OF THE INVENTION

Figure 1A:
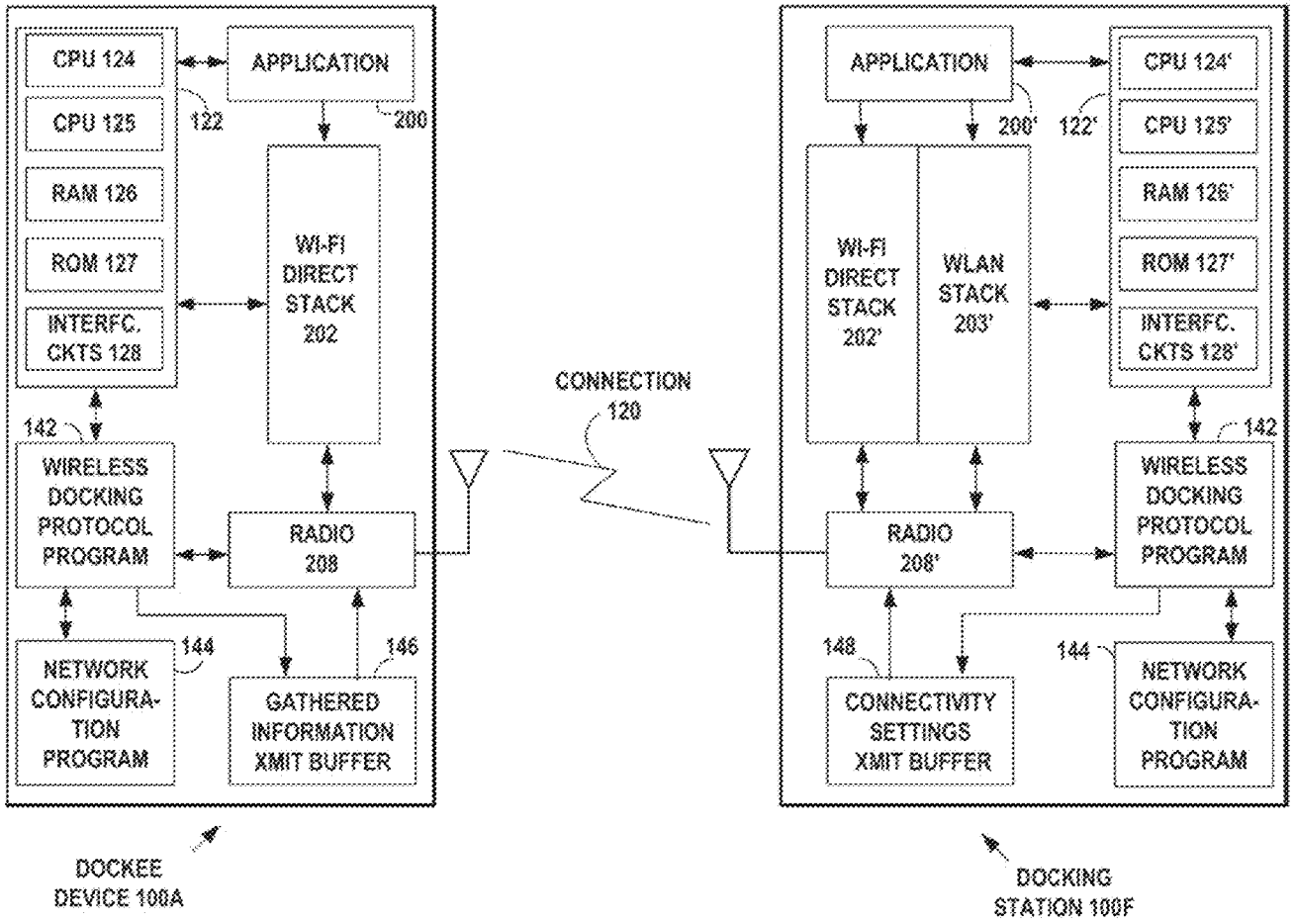
FIG. 1A is an example embodiment of a Dockee device A comprising a single Wi-Fi communications protocol stack operating in Wi-Fi Direct mode, and an example wireless Docking Station device F comprising a dual Wi-Fi communications protocol stack operating in Wi-Fi Direct and Infrastructure modes, performing a wireless docking procedure over a Wi-Fi Direct communication connection, according to an embodiment of the present invention.

Wi-Fi refers to the family of related IEEE 802.11 specifications that specify methods and techniques of wireless local area network (WLAN) operation. Examples include the IEEE 802.11b and 802.11g wireless local area network specifications, which have been a staple technology for traditional Wi-Fi applications in the 2.4 GHz ISM band. Emerging broadband applications have stimulated interest in developing very high-speed wireless networks for short range communication, for example, the IEEE 802.11n, the planned IEEE 802.11ac, and the planned IEEE 802.11 ad WLAN specifications that are to provide a very high throughput in higher frequency bands. Wi-Fi applications include 802.11 products such as consumer electronics, telephones, personal computers, and access points for both for home and small office.

In an example application of Wi-Fi, a wireless router may be connected through a cable modem or DSL modem to the Internet and serves as a wireless access point for personal computers equipped with a wireless network interface card and for other wireless devices such as wireless repeaters using a Wi-Fi standard. Setting up a wireless router Wi-Fi network includes configuring the nodes of the network with security features enabled by the Wi-Fi network standard.

Conventional Wi-Fi networks include an access point to which are connected one or more computers and peripheral devices by wired and wireless connections. Wi-Fi networks are typically set up as infrastructure networks, where the access point is a central hub to which Wi-Fi capable devices are connected. The devices do not communicate directly with one another, but communicate indirectly through the access point.

Network setup has been simplified by the Wi-Fi Protected Setup™ system that is included in most access points. The Wi-Fi Alliance published the Wi-Fi Protected Setup (WPS) specification 1.0, Wi-Fi Protected Setup Specification, Version 1.0h, December 2006 (incorporated herein by reference). The Wi-Fi Simple Configuration (WSC) Specification, Version 2.0, Dec. 20, 2010, (incorporated herein by reference), updates the Wi-Fi Protected Setup Specification, Version 1.0h. The acronym WSC, for Wi-Fi Simple Configuration Specification, may be used interchangeably with the acronym WPS, for Wi-Fi Protected Setup. Wi-Fi Protected Setup facilitates the initial setting up of 802.11 devices in a Wi-Fi infrastructure network so that they may be more easily configured with security features and so that that new Wi-Fi devices may be added to the network. Wi-Fi Protected Setup allows access points to be set up by entering a PIN. The Protected Setup system uses this information to send data to a computer connected to the access point, to complete the network setup. Wi-Fi Protected Setup defines new 802.11 information elements (IE) that are included in beacons, probe requests and probe responses. The purpose of these IEs is to advertise the presence of devices that are capable of performing Wi-Fi Protected Setup operations.

The Wi-Fi Protected Setup 1.0 standard defines three types of components in a network: a Registrar, an Enrollee, and an Access Point (AP). A Registrar is a component with the authority to issue and revoke credentials to a network. A Registrar may be integrated into an AP or it may be separate from the AP. An Enrollee is a component seeking to join a wireless LAN network. An Authenticator is an AP functioning as a proxy between a Registrar and an Enrollee. A Registrar wireless device configures the Enrollee wireless device, and the AP acts as an Authenticator to proxy the relevant messages between the Registrar and the Enrollee. The messages exchanged in the session are a series of Extensible Authentication Protocol (EAP) request/response messages, ending with the Enrollee reconnecting to the network with its new configuration. EAP is an authentication framework defined in RFC 5247, for providing the transport and usage of keying material and parameters needed to establish a secure Wi-Fi network. The Wi-Fi Simple Configuration Specification, Version 2.0, Dec. 20, 2010, (incorporated herein by reference), updates the Wi-Fi Protected Setup Specification, Version 1.0h.

A standalone AP that supports Wi-Fi Protected Setup, includes a built-in Registrar and does not use an external Registrar. In initial WLAN setup with Wi-Fi Protected Setup, when initializing in a standalone mode, a Wi-Fi Protected Setup AP automatically chooses a random SSID and channel. A standalone AP that includes a Wi-Fi Protected Setup Registrar, issues keys to Enrollees via the Registration Protocol.

When an Enrollee is initialized, it looks for Beacons from APs and sends probe-requests with the WSC information element (IE) into either selected networks or into each network sequentially. It may also send probe-requests to each 802.11 channel with the WSC IE included. It looks for the WSC IE in probe-responses that it receives and can engage with one or more Registrars to further discover Registrar capabilities and to see if the user has selected a Registrar. The Enrollee may continue looking for selected Registrar flags in Beacons, probe-responses and any M2 messages and may cease scanning when it finds a Registrar indicating that it is prepared to configure the Enrollee.

The following example describes an example in-band setup procedure using Wi-Fi Protected Setup for adding Member devices using a Standalone AP/Registrar. The user may convey the Enrollee's device password to the AP/Registrar using keyboard entry or an out-of-band channel with NFC Connection Handover. This example does not show the exchange of preliminary M1 and M2D messages that may take place after the probe message exchange, because the Enrollee may be waiting for the user to configure the AP/Registrar with the Enrollee's device password.

1. The Enrollee sends its Discovery data in a probe request to a Wi-Fi Protected Setup AP or ad hoc wireless Registrar. The AP or wireless Registrar responds with its own Discovery data in the probe response.

2. The user may be prompted to enter the Enrollee's device password into the AP/Registrar using a keypad interface or an out-of-band channel.

3. The Enrollee connects and initiates the IEEE 802.1X port-based Network Access Control procedure for port-based authentication.

4. The Enrollee and Registrar exchange messages M1-M8 to provision the Enrollee.

5. The Enrollee disassociates and reconnects, using its new WLAN authentication Credential. The Enrollee is now connected to the network with its new configuration.

The Wi-Fi Alliance has developed a Wi-Fi Peer-to-Peer technology named Wi-Fi Direct™ that is specified in the Wi-Fi Alliance Peer-to-Peer Specification, October 2010 (incorporated herein by reference). Wi-Fi Direct, is also referred to herein as Wi-Fi Peer-to-Peer or Wi-Fi P2P. Wi-Fi Direct enables IEEE 802.11a, g, or n devices to connect to one another, peer-to-peer, without prior setup or the need for wireless access points. Wi-Fi Direct embeds a software access point into any device, which provides a version of Wi-Fi Protected Setup. When a device enters the range of the Wi-Fi Direct host, it can connect to it and then gather setup information using a Wi-Fi Protected Setup transfer. Devices that support Wi-Fi Direct may discover one another and advertise available services. Wi-Fi Direct devices support typical Wi-Fi ranges and the same data rates as can be achieved with an 802.11a, g, or n infrastructure connection. When a device enters the range of the Wi-Fi Direct host, it may connect to it using the existing protocol, and then gather setup information using a Wi-Fi Protected Setup 2.0 transfer.

Wi-Fi Direct-certified devices may create direct connections between Wi-Fi client devices without requiring the presence of a traditional Wi-Fi infrastructure network of an access point or router. Wi-Fi Direct-certified devices support connection with existing legacy Wi-Fi devices using the IEEE 802.11a/g/n protocols. Wi-Fi Direct Device Discovery and Service Discovery features allow users to identify available devices and services before establishing a connection, for example, discovering which Wi-Fi networks have a printer. Wi-Fi Direct devices may use Wi-Fi Protected Setup to create connections between devices.

A Wi-Fi Direct device is capable of a peer-to-peer connection and may support either an infrastructure network of an access point or router or a peer-to-peer (P2P) connection. Wi-Fi Direct devices may join infrastructure networks as stations (STAs) and may support Wi-Fi Protected Setup enrollee functionality. Wi-Fi Direct devices may connect by forming Groups in a one-to-one or one-to-many topology.

The Groups functions in a manner similar to an infrastructure basic service set (BSS). A single Wi-Fi Direct device will be the Group Owner (GO) that manages the Group, including controlling which devices are allowed to join and when the Group is started or terminated. The Group Owner (GO) will appear as an access point to legacy clients devices.

Wi-Fi Direct devices include a Wi-Fi Protected Setup Internal Registrar functionality and communication between Clients in the Group. Wi-Fi Direct devices may be a Group Owner (GO) of a Group and may be able to negotiate which device adopts this role when forming a Group with another Wi-Fi Direct device. A Group may include both Wi-Fi Direct devices and legacy devices (i.e., that are not compliant with the Wi-Fi Alliance Peer-to-Peer Specification). Legacy Devices can only function as Clients within a Group.

Wi-Fi Direct devices may support Discovery mechanisms. Device Discovery is used to identify other Wi-Fi Direct devices and establish a connection by using a scan similar to that used to discover infrastructure access points. If the target is not already part of a Group, a new Group may be formed. If the target is already part of a Group, the searching Wi-Fi Direct device may attempt to join the existing Group. Wi-Fi Protected Setup may be used to obtain credentials and authenticate the searching Wi-Fi Direct device. Wi-Fi Direct devices may include Service Discovery that enables the advertisement of services supported by higher layer applications to other Wi-Fi Direct devices. Service Discovery may be performed at any time (e.g. even before a connection is formed) with any other discovered Wi-Fi Direct device.

A Group may be created by a single Wi-Fi Direct device, such as when connecting a legacy device. When forming a connection between two Wi-Fi Direct devices, a Group may be formed automatically and the devices may negotiate to determine which device is the Group Owner. The Group Owner may decide if this is a temporary (single instance) or persistent (multiple, recurring use) Group. After a Group is formed, a Wi-Fi Direct device may invite another Wi-Fi Direct device to join the Group. The decision of whether or not to accept an invitation may be left to the invited Wi-Fi Direct device.

Concurrent Wi-Fi Direct Devices may participate in multiple Groups, simultaneously, each group requires own Wi-Fi stack. A Wi-Fi Direct Device that may be in a Group while maintaining a WLAN infrastructure connection at the same time is considered a Concurrent Device. This is a typical dual stack case, as presented in FIGS. 2C, 2E and 2G. For example, a laptop connected directly to a printer while simultaneously using a WLAN connection is operating as a Concurrent Device. Concurrent connections may be supported by a single radio and may support connections on different channels. Concurrent operation may be supported by multiple protocol stacks, for example, one for operation as a WLAN-STA and one for operating as a Wi-Fi Direct device. For example, two separate physical MAC entities may be maintained, each associated with its own PHY entity, or they may use a single PHY entity supporting two virtual MAC entities.

The Wi-Fi Peer-to-Peer Technical Specification v1.1, 2010 published by the Wi-Fi Alliance, provides for provisioning in Wi-Fi Direct networks. Provisioning is a phase of peer-to-peer group formation in which credentials for the peer-to-peer group are exchanged based on the use of Wi-Fi Simple Configuration. Credentials are information that is required to join a peer-to-peer group as defined in the Wi-Fi Simple Configuration Specification.

To allow for peer-to-peer device configuration, peer-to-peer devices may delay starting the provisioning phase until the expiration of the larger of the peer-to-peer group owner's (GO) configuration time and the peer-to-peer client's client configuration time, based on respective configuration timeout attributes exchanged during a preceding group owner negotiation.

The peer-to-peer device selected as peer-to-peer group owner (GO) during group owner negotiation may start a peer-to-peer group session using the credentials it intends to use for that group. The peer-to-peer group owner (GO) may use the operating channel indicated during group owner negotiation, if available. The peer-to-peer client may connect to the peer-to-peer group owner to obtain credentials. If the operating channel is not available the peer-to-peer group owner may use another channel from a channel list attribute sent in the group owner negotiation confirmation frame. The peer-to-peer client may have to scan to find the peer-to-peer group owner if the intended operating channel is not available. A group formation bit in a peer-to-peer group capability bitmap of the peer-to-peer capability attribute may be set to one until provisioning succeeds.

Provisioning may be executed in Wi-Fi Direct networks, as described in the Wi-Fi Simple Configuration (WSC) Specification, Version 2.0, Dec. 20, 2010: The peer-to-peer group owner (GO) may serve the role as the access point with an internal registrar. It will only allow association by the peer-to-peer device that it is currently with in a group formation. Since the user has entered the WSC PIN or triggered the WSC pushbutton functionality on both devices, the registrar may send an m2 message in response to an m1 message. The peer-to-peer client may serve the role as the STA enrollee. It may associate to the peer-to-peer device that it is currently with in the group formation.

If provisioning fails, then group formation ends and the peer-to-peer group owner (GO) may end the peer-to-peer group session. If provisioning fails, the peer-to-peer device may retry group formation or return to device discovery. On successful completion of provisioning in Wi-Fi Direct networks, the peer-to-peer group owner (GO) may set the group formation bit in the peer-to-peer group capability bitmap of the peer-to-peer capability attribute to zero. At this point the peer-to-peer client may join the peer-to-peer group in the Wi-Fi Direct network, using the credentials supplied during provisioning.

A next generation IEEE 802.11 WLAN standard is being currently developed as the IEEE 802.11 TGz standard, which includes the feature of Tunneled Direct Link Setup (TDLS) with Channel Switching. This feature enables two mobile wireless devices (STAs) in an infrastructure BSS to directly exchange frames of data over a direct data transfer link, without requiring the access point (AP) in the infrastructure BSS to relay the frames.

One of the methods provided by the Wi-Fi Simple Configuration Specification, Version 2.0, Dec. 20, 2010, (incorporated herein by reference), is the Near-Field Communication (NFC) method, in which the user brings a new wireless client device (STA) close to an access point (AP) or Registrar of the Network to allow near field communication between the devices.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection, which is then compatible with other known wireless technologies, such as Bluetooth™ or wireless local area network (WLAN).

Near-field communication (NFC) technology used in the Wi-Fi Protected Setup (WPS) standard, communicates between two NFC Devices or between an NFC Device and an NFC Tag via magnetic field induction, where two loop antennas are located within each other's near field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The NFC radio may be affixed to a new wireless client device (STA) and the user brings the NFC radio on the device close to an access point (AP) or Registrar of the Network to allow near field communication between the devices. NFC technology is an extension of the ISO/IEC 14443 proximity-card standard (incorporated herein by reference) for contactless smartcards and radio frequency ID (RFID) devices, which combines the interface of a contactless smartcard and a reader into a single device, and uses the ISO/IEC 18092 NFC communication standard (incorporated herein by reference) to enable two-way communication. An NFC radio may communicate with both existing ISO/IEC 14443 contactless smartcards and readers, as well as with other NFC devices by using ISO/IEC 18092. The NFC Forum™, a non-profit industry association, has released specifications that enable different operation modes called: tag emulation, read/write mode, and peer to peer communication. Furthermore, NFC Forum has defined specifications for NFC Data Exchange Format (NDEF), NFC Tag Types, NFC Record Type Definition, and Connection Handover Specification. See, for example, Connection Handover Technical Specification, NFC Forum™, Connection Handover 1.1, NFCForum-TS-ConnectionHandover_1.1, 2008-Nov.-06 (incorporated herein by reference). The ISO/IEC 18092 standard defines communication modes for Near Field Communication Interface and Protocol (NFCIP-1) using inductively coupled devices operating at the center frequency of 13.56 MHz for interconnection of computer peripherals. The ISO/IEC 18092 standard specifies modulation schemes, codings, transfer speeds and frame format of the RF interface, initialization schemes, conditions required for data collision control during initialization, and a transport protocol including protocol activation and data exchange methods.

The Wi-Fi Protected Setup (WPS) 1.0 specification published by the Wi-Fi Alliance, Wi-Fi Protected Setup Specification, Version 1.0h, December 2006, defines a near-field communication (NFC) setup method for IEEE 802.111 WLAN Infrastructure setup that includes an access point (AP), and is currently the only official Wi-Fi Protected Setup specification. The access point (AP) defines the roles of registrar and enrollee for the requesting device and the selecting device. The Wi-Fi Protected Setup (WPS) 2.0 specification (to be published) updates the NFC setup method for WLAN Infrastructure mode that includes an access point (AP). Current WLAN device-to-device technologies include the IEEE 802.11 IBSS (Ad Hoc), Wi-Fi networks, and Bluetooth.

The basic handover to a Wi-Fi carrier stores wireless LAN parameters and credentials on NFC Forum Tags as part of its Wi-Fi Protected Setup (WPS) specification 1.0. The information is stored in the payload of an NFC Data Exchange Format (NDEF) record identified by the mime-type "application/vnd.wfa.wsc", known as the "WPS Record". The wireless LAN parameters and credentials information provided inside a WPS Record includes the IEEE 802.11 Service Set Identifier (SSID), authentication and encryption type deployed by the wireless network, the secret network key that a wireless station needs to authenticate with the network, and the MAC address of the device receiving the configuration (if unknown, this address is set to all-zeros). The Wi-Fi Protected Setup specification 1.0 uses the term "Registrar" for a device that is able to provide WLAN credentials and "Enrollee" for a device that wants to join a wireless network.

In the Wi-Fi Simple Configuration Specification, Version 2.0, Dec. 20, 2010, a Handover Requester with Wi-Fi capability may format an NFC Handover Request Message in the NFC Data Exchange Format (NDEF), that indicates that the requester is an IEEE 802.11 device, but which does not include any configuration information. A Handover Request may be sent via the NFC link in at least two scenarios: [1] the requester may not have yet joined a wireless domain or [2] even if the requester is already member of a WLAN network, a peer device may be in different network and thus a Connection Handover is required to obtain the peer device's credentials. In the Wi-Fi Protected Setup specification 2.0, the Handover Selector would deduce from this message that the Handover Requester supports a Wi-Fi certified IEEE 802.11 radio. In the Wi-Fi Protected Setup specification 2.0, if the Handover Selector is a Wi-Fi device with wireless connectivity, it should respond with an NFC Handover Select Message in the NFC Data Exchange Format (NDEF), with a configuration record that includes credentials, such as network index, SSID, authentication type, encryption type, network key, and MAC address.

The NFC Data Exchange Format (NDEF) specification, NFC Forum Data Exchange Format (NDEF) Specification, NFC Forum™, 2006 (incorporated herein by reference), defines a common data format for NFC devices to exchange application or service specific data. An NDEF message is constructed of a number of NDEF records, with the first and the last record providing message begin and end markers. Between two NFC Devices, NDEF messages may be exchanged over the NFC Logical Link Control Protocol (LLCP) protocol, specified in NFC Forum Logical Link Control Protocol Specification, NFC Forum™, 2009 (incorporated herein by reference). The NFC Connection Handover specification, NFC Forum Connection Handover Specification, NFC Forum™, 2008 (incorporated herein by reference), defines the exchange of NDEF messages between two NFC Devices in a negotiated handover to discover and negotiate alternative wireless communication technologies.

The Handover Requester in the Wi-Fi Protected Setup specification 2.0, would then typically use the SSID and Network Key to enroll on the same Wi-Fi network to which the Handover Selector is connected. Further possible actions depend on the provision of an IP address identifying the Handover Selector, the available services, and the Handover Requester's intended activity.

The method, apparatus, and computer program product embodiments disclosed herein enable simplified configuring of a wireless docking environment for wireless devices, using Wi-Fi Protected Setup and Wi-Fi Direct. Optionally, NFC Connection Handover may be used to initiate the Wi-Fi Protected Setup process during configuring of the wireless docking environment.

Example Wireless Docking Environments

Wireless docking is referred to herein as connecting a mobile device to a group of peripheral devices wirelessly. Typical peripherals include e.g. display, input devices (mouse, keyboard, touch-screen), mass storage, printer etc.

The following are terms used herein to describe example features of a wireless docking environment, according to an embodiment of the invention:

Docking Environment:

a group of peripherals that belong together.

a docking environment may be configured by:

adding, or removing, peripherals from the docking environment needs deliberate action a Dockee may expect to automatically connect with all peripherals that are available in the environment.

Dockee:

a portable product (e.g. smart phone, netbook, laptop, camera) that is brought into the docking environment and uses the peripherals.

Docking Station:

a device that coordinates the setup of connections between Dockee and all peripherals in the environment in addition it may also provide the connection between Dockee and legacy peripherals Peripheral:

e.g. mouse, keyboard, USB hard drive, webcam, display, . . .

may be connected to Dockee (wireless) or Docking Station (wired or wireless)

The docking environment may be divided to the following types:

Centralized Docking Environment

Dockee connects to peripherals through Docking Station.

Dockee will have only one wireless connection; to Docking Station.

Distributed Docking Environment

Dockee connects to each peripheral directly.

Dockee have own wireless connection for each peripheral (In case of Wi-Fi there may be only single WLAN network where multiple peripherals are attached.)

Hybrid Docking Environment

Combination of centralized and distributed environments, i.e. some of the peripherals are connected directly and some through Docking Station.

Wi-Fi has three different network operating modes; Basic Service Set (BSS), i.e., an Infrastructure network, Independent Basic Service Set (IBSS), i.e., an Ad Hoc network, and Peer-To-Peer (P2P), i.e., a Wi-Fi Direct network. Conventionally, each WLAN type requires its own independent WLAN protocol stack with an independent state machine. Advanced devices such as laptops etc. may be able to simultaneously operate on different network types using a dual/multi-stack WLAN implementation, but such complexity cannot be assumed for simpler devices such as digital cameras. However, in certain wireless docking scenarios, there is need for multi-WLAN type operation. The standard Wi-Fi Protected Setup operation does not take the network limitations of simpler devices into consideration and does not consider dependencies that may exist between WLAN networks. The standard Wi-Fi Protected Setup procedure does not consider specific wireless docking requirements, such as latency between a Dockee device and a Docking Station.

Embodiments of the invention enable simplified configuring of a wireless docking group for wireless devices by allowing a wireless device to communicate its capabilities and characteristics of one or more wireless devices within a wireless docking group, using a new Wireless Docking Protocol to a wireless Docking Station that will use that information and the Wireless Docking Protocol to define an optimal set of connections for wireless devices in the wireless docking group.

Embodiments of the invention enable a Dockee device to connect and maintain network connectivity while connecting to wireless Docking Station.

Embodiments of the invention enable a Dockee to communicate its capabilities and characteristics of one or more wireless devices within a wireless docking group to the Docking Station. The Docking Station will carry out actions to enable connectivity between Dockee and Docking Station and also between Dockee and peripheral devices and Access Point (AP). The dataset of capabilities and characteristics sent by the Dockee device to the Docking Station are collectively referred to herein as the "network configuration program" information. Examples of the network configuration program 144 include the Smart Connectivity Setup Protocol and the Universal Plug and Play (UPnP) Protocol. The Wireless Docking Protocol transfers the network configuration program 144 information from the Dockee device to the Docking Station.

In example embodiments of the invention, final connectivity settings may be made based on the minimum requirements for the Dockee (e.g. a wireless docking standard may define minimum Wi-Fi capability requirements for the Dockee and Docking Station). However, during setup phase of the docking environment, the Dockee device's specific connectivity capabilities may be utilized for creating temporary connections, if needed.

In example embodiments of the invention, the user may be instructed via Dockee's user interface with additional guidance, when needed.

Embodiments of the invention build on Wi-Fi Protected Setup and Wi-Fi Direct and add a new Wireless Docking Protocol (WDP) that enables signaling and configuration between all related entities. Embodiments of the invention allow legacy devices to operate in this environment.

The Dockee may potentially be any kind of device, from laptop to digital camera, and thus embodiments of the invention accommodate both single and dual protocol stack Dockees.

In example embodiments of the invention, the Dockee has specific support for wireless docking. The Docking Station implements dual connectivity to ensure enough flexibility for the connectivity, and enable all relevant wireless docking scenarios. The Docking Station acts as a bridge when connected to an access point. When working without Internet connectivity, the Docking Station may act as a Dynamic Host Configuration Protocol (DHCP) server, as defined in Wi-Fi Direct.

In example embodiments of the invention, when an Infrastructure network is available, Tunneled Direct Link Setup (TDLS) may be usable to optimize architecture and data path, instead of using Wi-Fi Direct. When using TDLS, two Infrastructure client devices may form a direct link between them, and data sent over that link need not be routed through the access point.

Scenario [1]—Single Stack Dockee with Wi-Fi Direct with Existing Infrastructure Network FIG. 1A is an example embodiment of a Dockee device 100A comprising a single Wi-Fi communications protocol stack 202 operating in Wi-Fi Direct mode, and an example wireless Docking Station device 100F comprising a dual Wi-Fi communications protocol stack 202' and 203' operating in Wi-Fi Direct and Infrastructure modes, performing a wireless docking protocol 142 procedure over a Wi-Fi Direct communication connection 120, according to an embodiment of the present invention.

The wireless Docking Station device 100F includes a processor 122', which includes a single core CPU or multiple core central processing unit (CPU) 124' and 125', a random access memory (RAM) 126', a read only memory (ROM) 127', and interface circuits 128' to interface with one or more radio transceivers 208', battery or house power sources, keyboard, display, etc. The RAM and ROM can be removable memory devices such as smart cards, SIMs, WIMs, semiconductor memories such as RAM, ROM, PROMS, flash memory devices, etc. The wireless Docking Station device 100F may include an NFC circuit to communicate with an NFC circuit in mobile phone Dockee device 100A, to respond to an handover to the Wi-Fi Direct communication connection 120.

The mobile phone Dockee device 100A includes a processor 122, which includes a dual core central processing unit 124 and 125, a random access memory (RAM) 126, a read only memory (ROM) 127, and interface circuits 128 to interface with one or more radio transceivers 208, battery and other power sources, key pad, touch screen, display, microphone, speakers, ear pieces, camera or other imaging devices, etc. in the mobile phone Dockee device 100A. The RAM and ROM can be removable memory devices such as smart cards, SIMs, WIMs, semiconductor memories such as RAM, ROM, PROMS, flash memory devices, etc. The mobile phone Dockee device 100A may include an NCI circuit to communicate with an NCI circuit in Docking Station 100F, to initiate the handover to the Wi-Fi Direct communication connection 120.

An example embodiment of the WLAN (Wi-Fi) wireless docking protocol 142 program and network configuration program 144 may be computer code instructions stored in the RAM and/or ROM memory of the processor 122' in the wireless Docking Station device 100F, which when executed by the central processing units (CPU), carry out the functions of the example embodiments of the invention. The connectivity settings transmit buffer 148 in the Docking Station 100F buffers the Wi-Fi connectivity settings determined by the network configuration program 144. The connectivity settings transmit buffer 148 may be a partition in the RAM memory 126' of the processor 122' in the Docking Station 100F.

An example embodiment of the WLAN (Wi-Fi) wireless docking protocol 142 program and network configuration program 144 may be computer code instructions stored in the RAM and/or ROM memory of the processor 122 in the mobile phone Dockee device 100A, which when executed by the central processing units (CPU), carry out the functions of the example embodiments of the invention. The gathered information transmit buffer 146 in the Dockee device 100A buffers gathered information, including information about the Dockee device's capabilities and characteristics of one or more wireless devices within a wireless docking group. The gathered information transmit buffer 146 may be a partition in the RAM memory 126 of the processor 122 in the mobile phone Dockee device 100A.

Figure 2A:
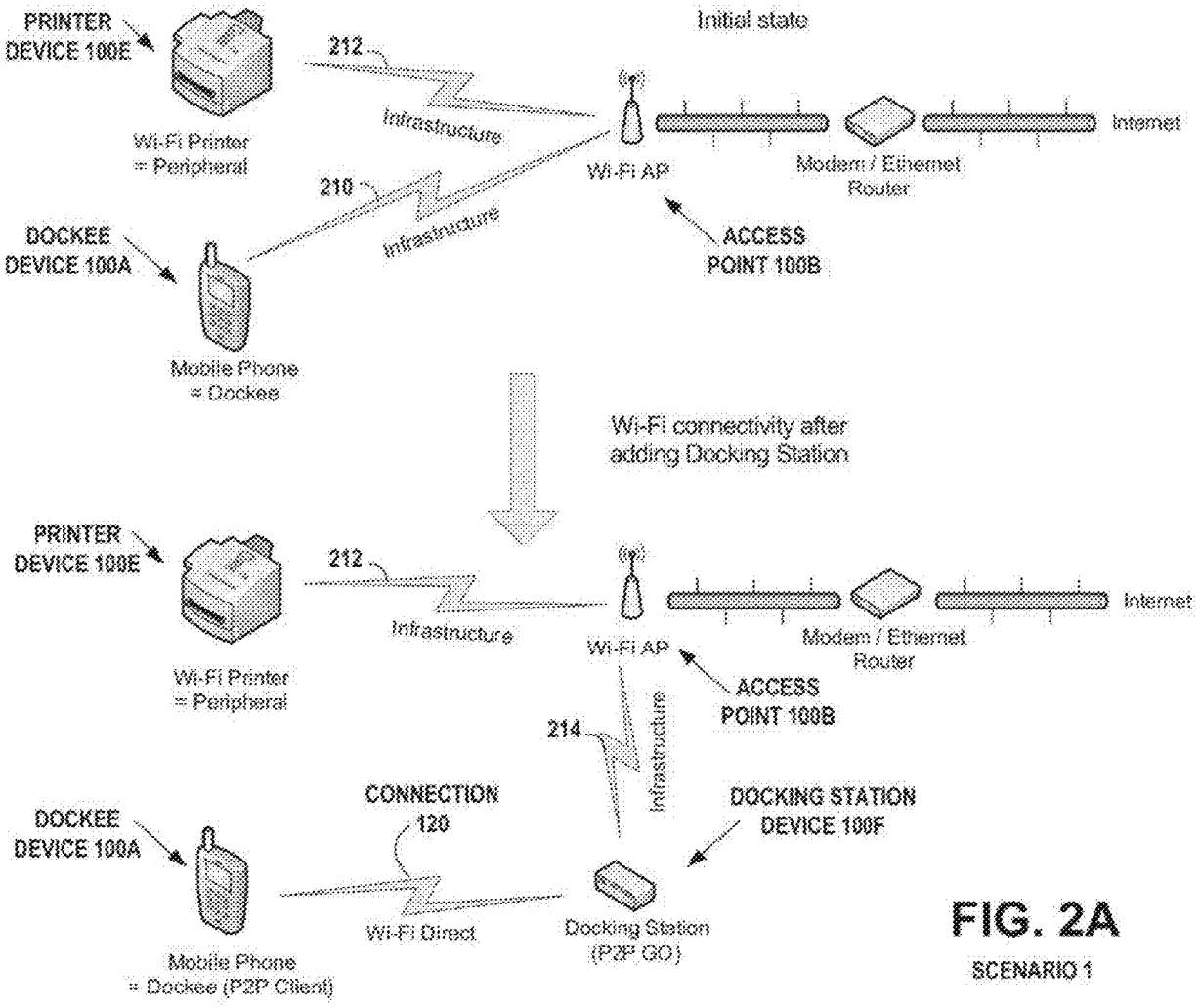
FIG. 2A is a wireless network diagram of an example embodiment, showing a transformation of an existing Wi-Fi infrastructure network configuration of a mobile phone having a single Wi-Fi stack supporting Wi-Fi Direct and Infrastructure operation modes, connected as a client to an access point, and a single stack printer that supports Wi-Fi Protected setup, which is also connected to the access point, the transformation creating a wireless docking environment by means of a Docking Station having a dual Wi-Fi stack supporting Wi-Fi Direct and Infrastructure operation modes, performing a wireless docking procedure to create the wireless docking environment, with the mobile phone in the role of a Dockee, the printer as a peripheral, and the access point providing Wi-Fi connectivity in the environment, according to an embodiment of the present invention.

FIG. 2A is a wireless network diagram of an example embodiment, showing a transformation of an existing Wi-Fi infrastructure network configuration of a mobile phone 100A having a single Wi-Fi stack supporting Wi-Fi Direct and Infrastructure operation modes, connected over link 120 as a client to an access point, and a single stack printer 100E that supports Wi-Fi Protected setup, which is also connected to the access point, the transformation creating a wireless docking environment by means of a Docking Station 100F having a dual Wi-Fi stack supporting Wi-Fi Direct and Infrastructure operation modes, performing the Wireless Docking Protocol 142 procedure with the Dockee device 100A to create the wireless docking environment, with the mobile phone 100A in the role of a Dockee connected over new link 120 to access point 100B, the printer 100E as a peripheral connected over existing link 212 to Docking Station 100F, and the access point 100B connected over new link 214 to Docking Station 100F, the access point providing Wi-Fi connectivity in the environment, according to an embodiment of the present invention.

In the example of FIG. 2A, the mobile phone 100A has a single Wi-Fi Direct stack 202. The Mobile phone 100A is used to setup wireless docking environment. In the initial state of FIG. 2A, the user has created an Infrastructure network with two client devices; the mobile phone 100A and the printer 100E, using two Wi-Fi Protected Setup (WPS) procedures, between the mobile phone 100A and the AP 100B and between the printer 100E and the AP 100B.

In the example of FIG. 2A, then user buys the Docking Station 100F to create a wireless docking environment, and the user wants to use the existing mobile phone 100A (as a Dockee), the printer 100E (as a Peripheral) and the AP 100B (for Wi-Fi connectivity) for that environment.

In example embodiments of the invention, a new protocol is employed to setup the wireless docking environment, called Wireless Docking Protocol (WDP). In example embodiments of the invention, Dockee capabilities and characteristics of one or more wireless devices within a wireless docking group may be expressed in a standard format such as in XML documents, according WDP XML Schemas. Actions required may also be expressed in XML or in some other format. Both actions and configuration data may be carried over different protocols. For instance, universal plug and play (UPnP) device control protocol may be used to carry out information exchange. Alternately, modifying the Wi-Fi Protected setup or Wi-Fi Direct protocols may be used to carry out information exchange. However, the format of WDP messages is not limiting in embodiments of the invention.

In example embodiments of the invention:

Both Dockee and Docking Station implement WDP

Docking Station may be at least dual stack device

Dockee and Docking Station may support Wi-Fi Direct

Wi-Fi Peripheral may support standard WPS

In setting up the wireless docking environment, the Docking Station has the primary role to play. The Dockee has an assistant role during the setup of the wireless docking environment.

Peripherals may be legacy devices without specific wireless docking support, thus only standard Wi-Fi Protected Setup (WPS) implementation may be assumed for the peripherals.

Because setup of Wireless Docking environment requires some user action in some embodiments, a user application, such as a setup wizard, may be useful to give guidance to the user. The functions of such a setup wizard application would co-operate with the wireless docking protocol.

Example Wireless Docking Protocol

Figure 2B:
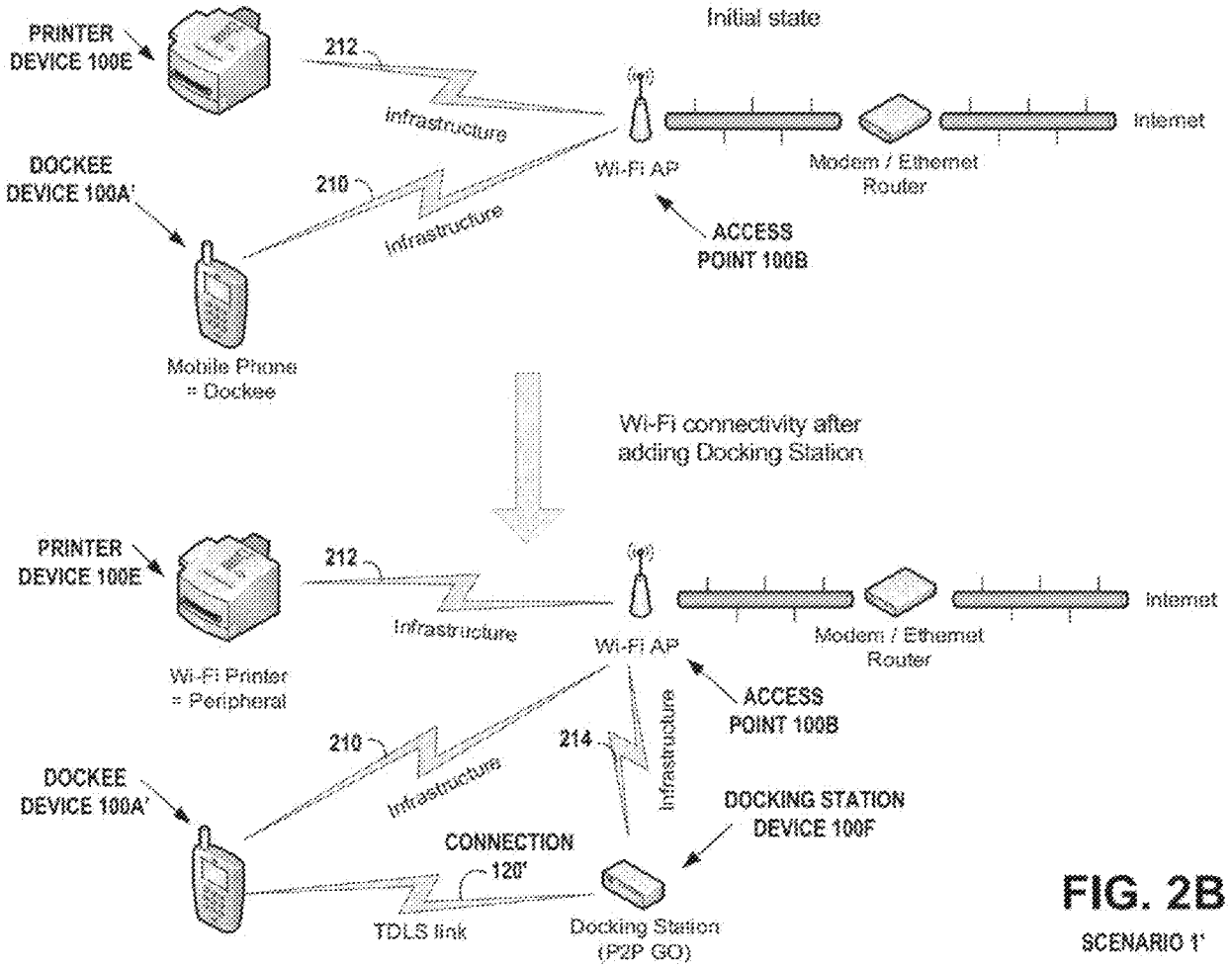
FIG. 2B is a wireless network diagram of an example embodiment, showing a transformation of an existing Wi-Fi infrastructure network configuration of a mobile phone having a dual protocol stack supporting TDLS and Infrastructure operation modes, with a WLAN communications protocol stack and a Tunneled Direct Link Setup communications protocol stack, connected as a client to an access point, and a single stack printer that supports Wi-Fi Protected setup, which is also connected to the access point, the transformation creating a wireless docking environment by means of a Docking Station having a dual protocol stack supporting TDLS and Infrastructure operation modes, with a WLAN communications protocol stack and a Tunneled Direct Link Setup communications protocol stack, performing a wireless docking procedure to create the wireless docking environment, with the mobile phone in the role of a Dockee, the printer as a peripheral, and the access point providing Wi-Fi connectivity in the environment, according to an embodiment of the present invention.
Figure 2C:
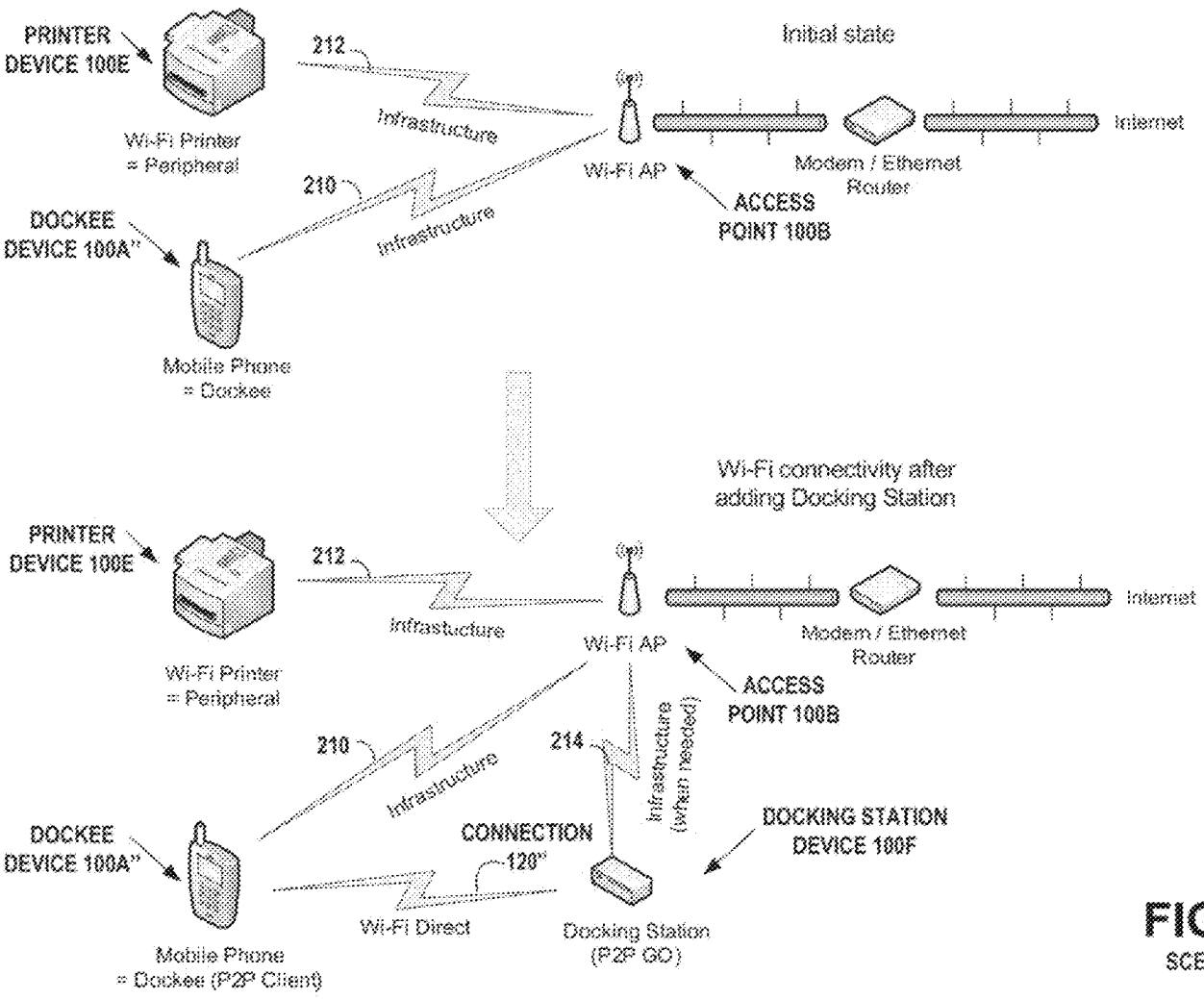
FIG. 2C is a wireless network diagram of an example embodiment, showing a transformation of an existing Wi-Fi infrastructure network configuration of a mobile phone having a dual Wi-Fi communications protocol stack supporting Wi-Fi Direct and Infrastructure operation modes, connected as a client to an access point, and a single stack printer that supports Wi-Fi Protected setup, which is also connected to the access point, the transformation creating a wireless docking environment by means of a Docking Station having a dual Wi-Fi communications protocol stack supporting Wi-Fi Direct and Infrastructure operation modes, performing a wireless docking procedure to create the wireless docking environment, with the mobile phone in the role of a Dockee, the printer as a peripheral, and the access point providing Wi-Fi connectivity in the environment, according to an embodiment of the present invention.
Figure 2D:
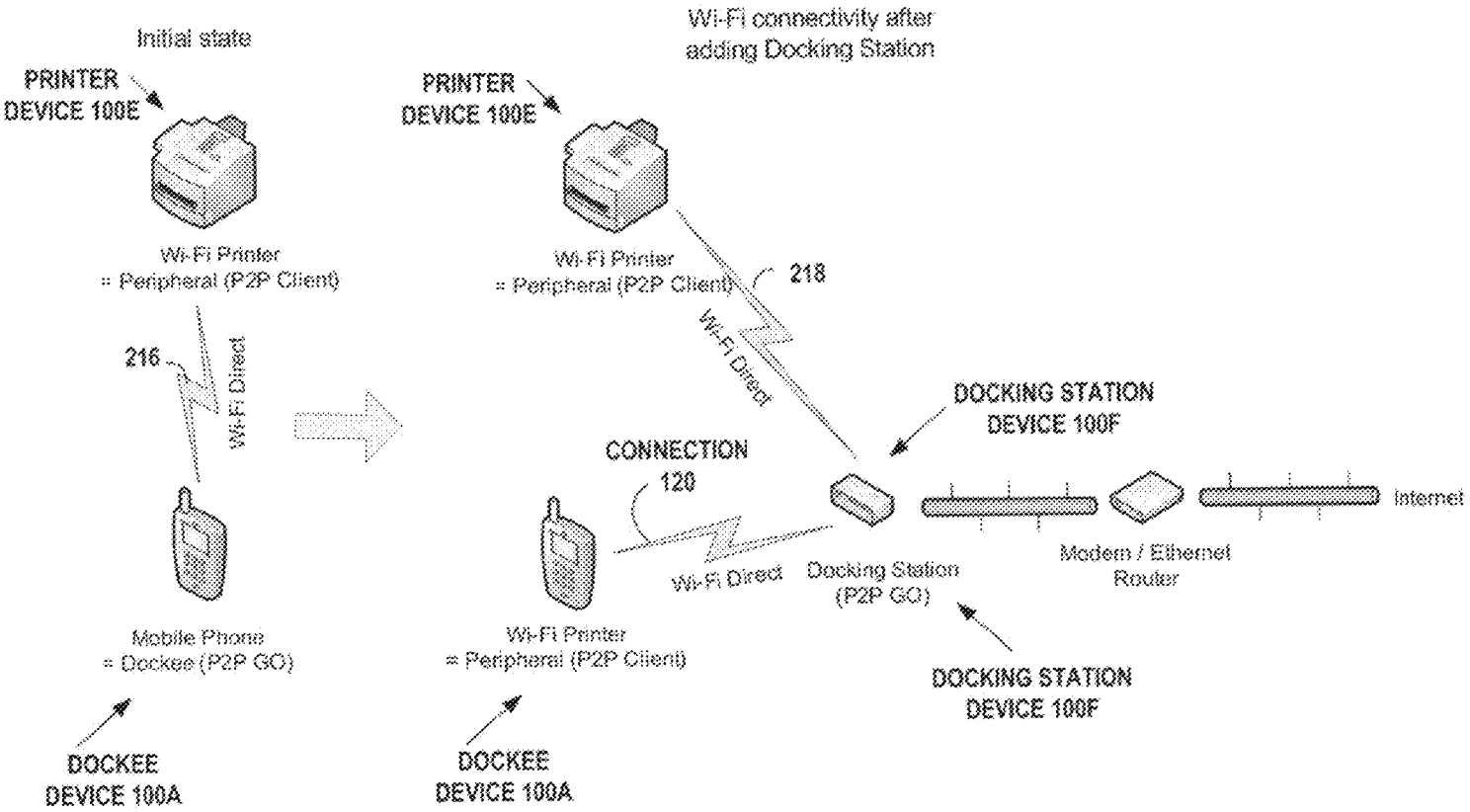
FIG. 2D is a wireless network diagram of an example embodiment, showing a transformation of an existing Wi-Fi network configuration of a mobile phone having a single Wi-Fi stack supporting Wi-Fi Direct and Infrastructure operation modes, connected to a single stack printer that supports Wi-Fi Direct, the transformation creating a wireless docking environment by means of a Docking Station having a dual Wi-Fi stack supporting Wi-Fi Direct and Infrastructure operation modes, performing a wireless docking procedure to create the wireless docking environment, with the mobile phone in the role of a Dockee, the printer as a peripheral, and the Docking Station providing Wi-Fi connectivity in the environment, according to an embodiment of the present invention.
Figure 2E:
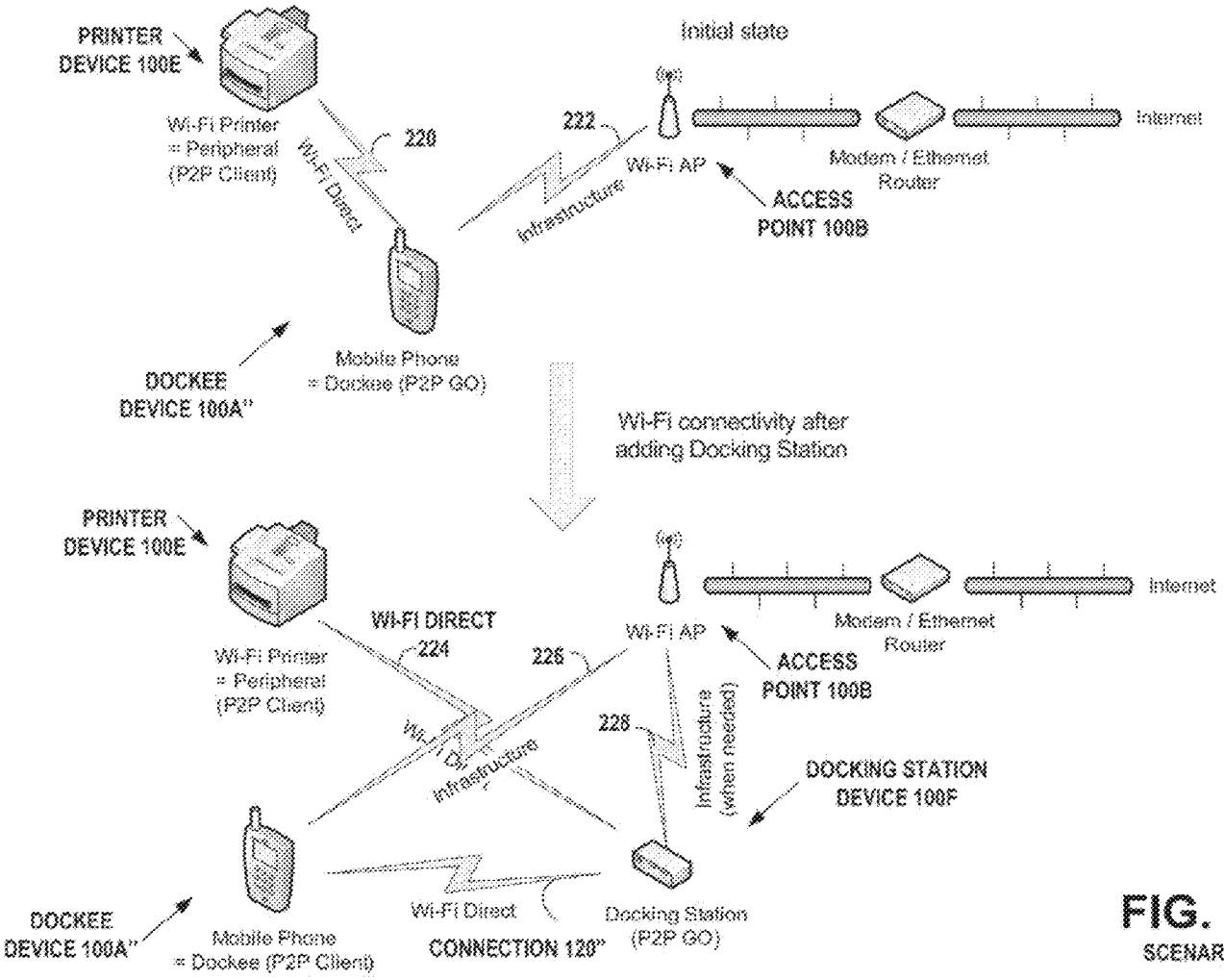
FIG. 2E is a wireless network diagram of an example embodiment, showing a transformation of an existing Wi-Fi infrastructure network configuration of a mobile phone having a dual Wi-Fi communications protocol stack supporting Wi-Fi Direct and Infrastructure operation modes, connected as a client to an access point, connected to a single stack printer that supports Wi-Fi Direct, the transformation creating a wireless docking environment by means of a Docking Station having a dual Wi-Fi communications protocol stack supporting Wi-Fi Direct and Infrastructure operation modes, performing a wireless docking procedure to create the wireless docking environment, with the mobile phone in the role of a Dockee, the printer as a peripheral, and the access point providing Wi-Fi connectivity in the environment, according to an embodiment of the present invention. The printer 100E is shown having a Wi-Fi Direct link 224 to the Docking station 100F.
Figure 2F:
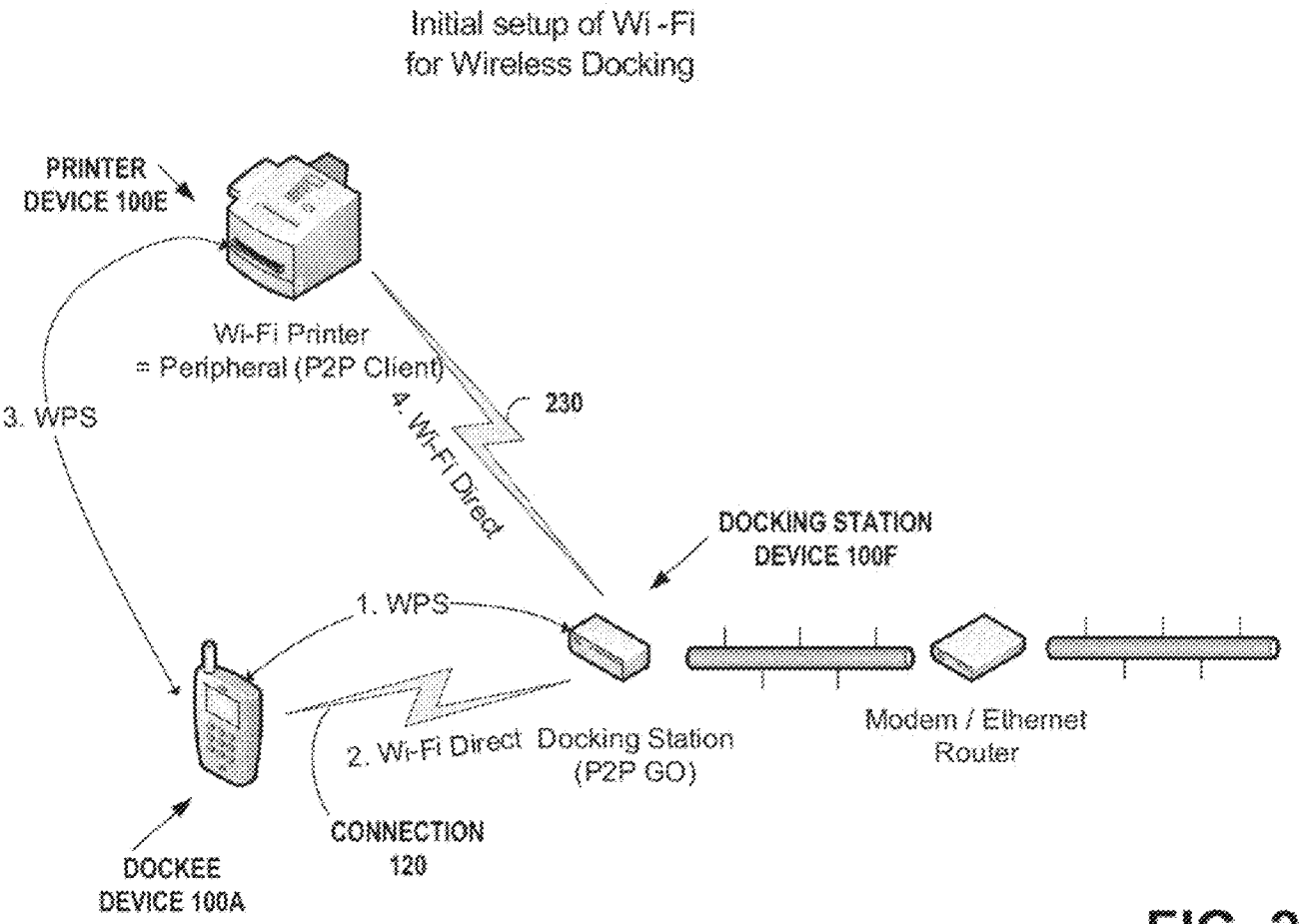
FIG. 2F is a wireless network diagram of an example embodiment, showing the creation of a wireless docking environment by means of a Docking Station having a dual Wi-Fi stack supporting Wi-Fi Direct and Infrastructure operation modes, performing a wireless docking procedure to create the wireless docking environment that includes a mobile phone having a single Wi-Fi stack supporting Wi-Fi Direct and Infrastructure operation modes, which assumes the role of a Dockee, the mobile phone/Dockee forwarding a user indication to the Docking Station that a single stack printer that supports Wi-Fi Direct is to be included in the wireless docking environment, the Docking Station providing Wi-Fi connectivity in the environment, according to an embodiment of the present invention.
Figure 2G:
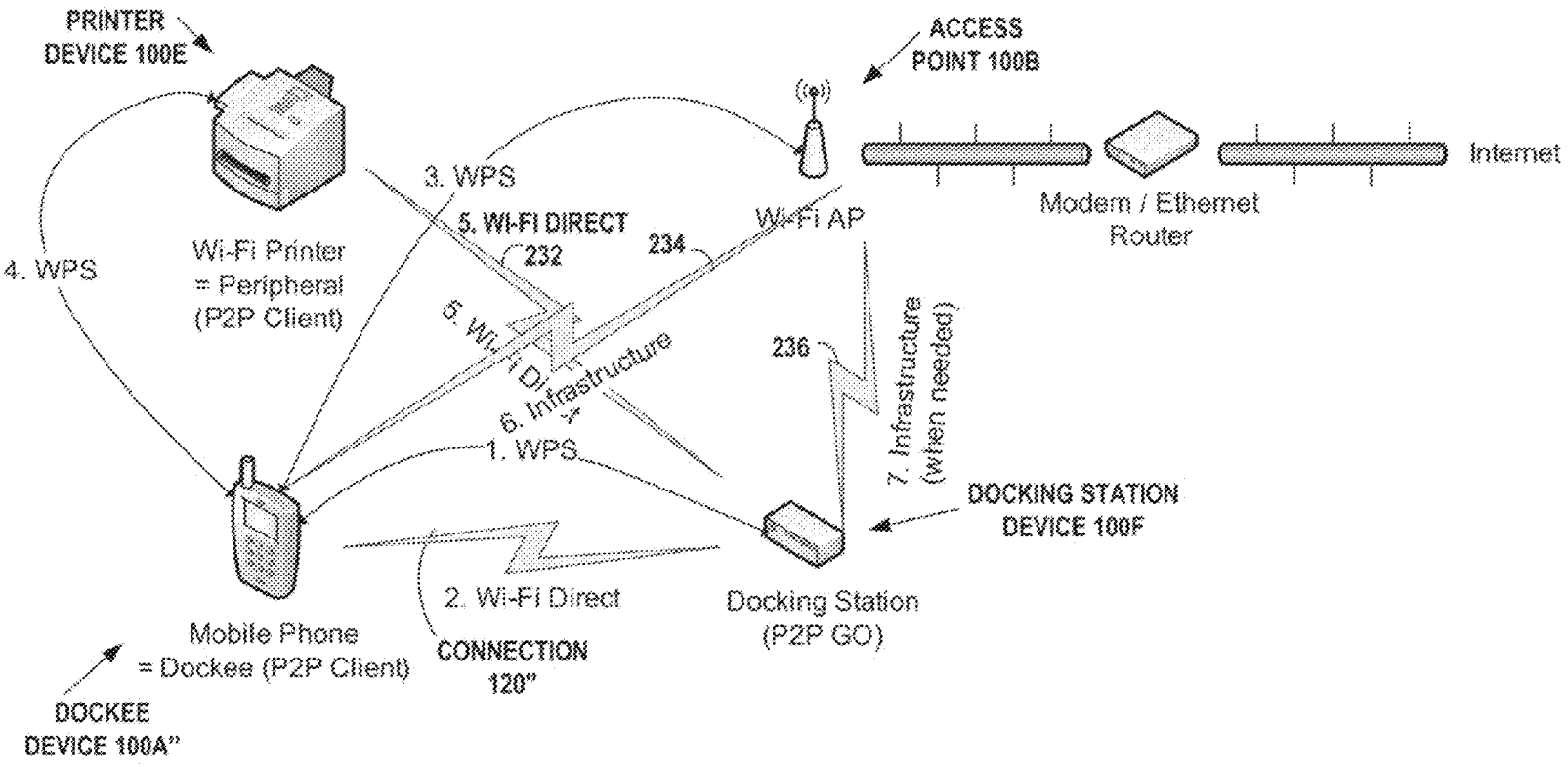
FIG. 2G is a wireless network diagram of an example embodiment, showing the creation of a wireless docking environment by means of a Docking Station having a dual Wi-Fi stack supporting Wi-Fi Direct and Infrastructure operation modes, performing a wireless docking procedure to create the wireless docking environment that includes a mobile phone having a dual Wi-Fi communications protocol stack supporting Wi-Fi Direct and Infrastructure operation modes, connected as a client to an access point, the mobile phone assuming the role of a Dockee, the mobile phone/Dockee forwarding a user indication to the Docking Station that a single stack printer that supports Wi-Fi Direct is to be included in the wireless docking environment, the mobile phone/Dockee providing Wi-Fi connectivity in the environment, according to an embodiment of the present invention. The printer 100E is shown having a Wi-Fi Direct link 232 to the Docking station 100F.
Figure 3:
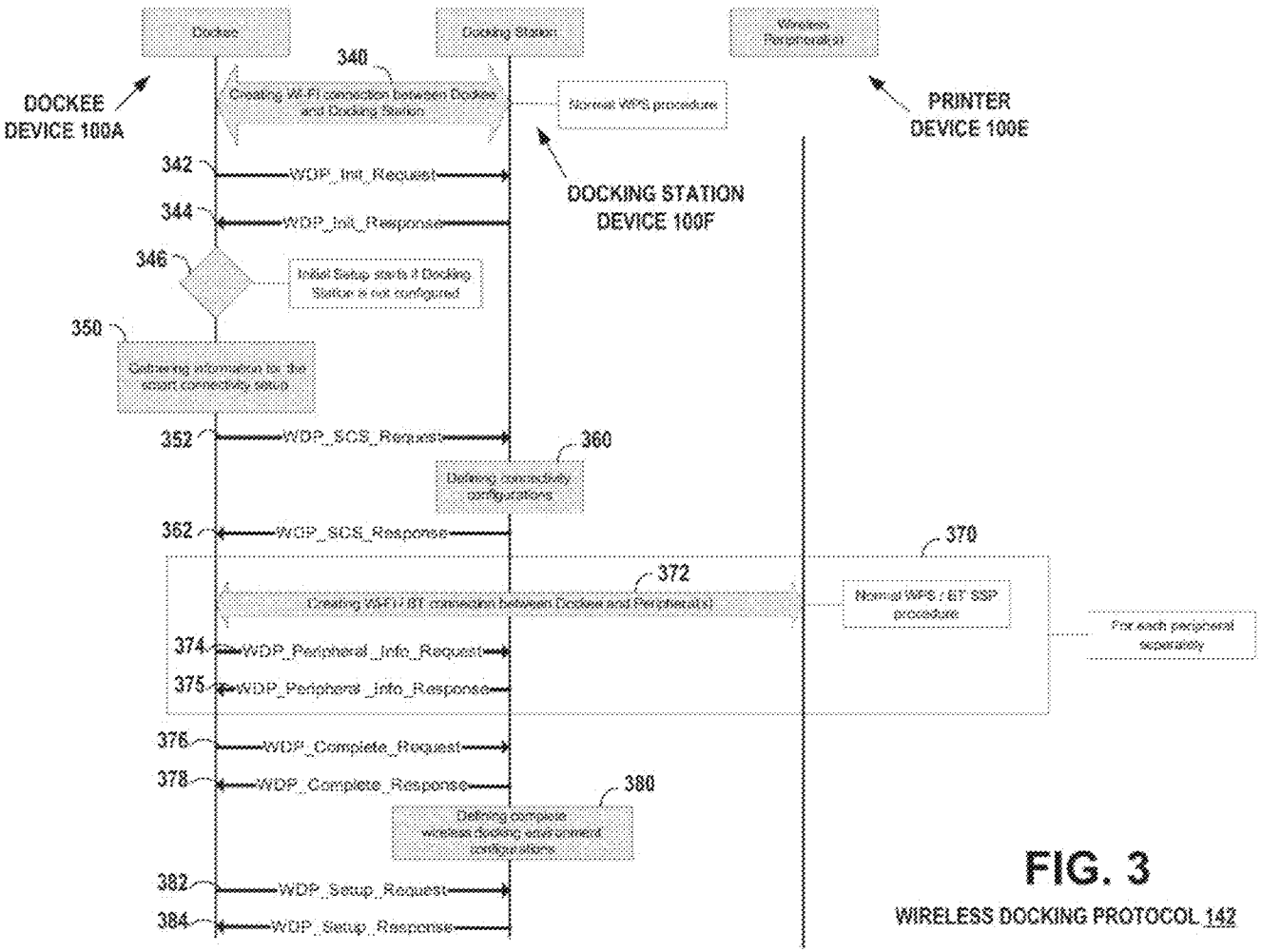
FIG. 3 is an example embodiment of a sequence diagram of the Docking Station performing the Wireless Docking Protocol procedure to create the wireless docking environment with the Dockee device, as shown in FIGS. 2A to 2G, according to an embodiment of the present invention.

FIG. 3 is an example embodiment of a sequence diagram of the Docking Station 100F performing the Wireless Docking Protocol 142 procedure to create the wireless docking environment with the Dockee device 100A, 100A', or 100A", as shown in FIGS. 2A to 2G, according to an embodiment of the present invention. The Wireless Docking Protocol 142 illustrated in FIG. 3 uses as its network configuration program 144, the Smart Connectivity Setup Protocol. The following description of the sequence diagram of FIG. 3 uses the message format for the Smart Connectivity Setup Protocol.

The first step 340 in wireless docking environment setup is to create Wi-Fi connectivity link 120 between Dockee 100A and Docking Station 100F. The standard Wi-Fi Protected Setup (WPS) using NFC Connection Handover is a recommend method, since it can also carry wireless docking specific information) required to setup the Wi-Fi Direct network. The Docking Station 100F may become Group Owner (GO) of the peer-to-peer (P2P) network (Wi-Fi Direct has the means to ensure that the correct device becomes Group Owner).

After the establishment of Wi-Fi and IP connectivity link 120 between the Dockee 100A and Docking Station 100F, the WDP exchange may be performed for initial handshake and status exchange with Smart Connectivity Setup Protocol messages WDP_Init_Request in step 342 and WDP_Init_Response in step 344.

In example embodiments of the invention, the Dockee 100A may use Wi-Fi Direct Device Discovery and Service Discovery features to identify the printer 100E and gather its interface characteristics and its services. In example embodiments of the invention, the Dockee 100A communicates a dataset describing its own capabilities and the characteristics of the printer 100E, for example, to the Docking Station 100F. The dataset of capabilities and characteristics sent by the Dockee device 100A to the Docking Station 100F is collectively referred to herein as the "network configuration program" information. In example embodiments of the invention, the "network configuration program" information is in a format compatible with the network configuration program 144 that carries out the Smart Connectivity Setup Protocol. In example embodiments of the invention, the Wireless Docking Protocol transfers the network configuration program information from the Dockee device 100A to the Docking Station 100F in the format of the Smart Connectivity Setup Protocol.

In this case, Docking Station 100F indicates in step 346 that it is not configured, and actual initial setup of wireless docking environment is initiated. This may also trigger opening of the Wireless Docking Setup application (a wizard program to guide the user) on the Dockee 100A (unless already manually opened by the user).

Then in step 350, the Dockee 100A gathers information for the network configuration program 144, which in this example is in the format of the Smart Connectivity Setup Protocol. The gathered information includes information about the Dockee device 100A's capabilities and characteristics of one or more wireless devices, such as the printer 100E and access point 100B within a wireless docking group in FIG. 2A. Gathering information by the Dockee device 100A from wireless devices, such as the printer 100E and access point 100B, may be carried out, for example, using Wi-Fi Direct Device Discovery and Service Discovery features or the ad hoc network device discovery. The gathered information may be buffered in the gathered information transmit buffer 146 in the Dockee device 100A.

In the next phase, the Dockee 100A may forward the gathered information over link 120, including information about the Dockee device's capabilities and characteristics of one or more wireless devices within a wireless docking group, in step 352 to Docking Station 100F by using Smart Connectivity Setup Protocol WDP_SCS_Request message. The gathered information includes:

- Dockee device's Wi-Fi capabilities;
- Maximum number of parallel WLAN networks (=number of implemented Wi-Fi stacks)
- Supported Wi-Fi modes; Infrastructure, Wi-Fi Direct, etc.
- Supported Wi-Fi feature; TDLS, . . . .
- Wi-Fi status per each available connection:
- Network SSID, credentials (if willing to share)
- Network type, configuration methods
- Network type; P2P, Infrastructure . . . .
- Credentials of the network, (if allowed to send).
- Status (attached, is able to connect, or is aware of this network)
- Pairing mechanism: WPS (PBC, PIN, NFC), manual, other
- IP configuration (IP address, DHCP status, DNS, etc)
- Known Internet connections
- Interface/network
- Status (active, inactive)
- Whether this information may be shared
- Other information of similar type etc
- Information on current WLAN networks (=Dockee is currently attached to these networks);
- Information about Internet connectivity
  - WLAN used for Internet connection by the Dockee
  - FFS; Other connectivity methods (like cellular) used for Internet connectivity
- Willingness to disconnect and change IP address
- Known Wi-Fi peripherals
- Information on the other Wi-Fi devices (peripherals) nearby; either member of current WLAN network or detected during the scanning.
  - Device type**)
    - **) For example; during Wi-Fi Direct setup, Primary or Secondary Device Type attribute may have been sent to Dockee.
  - Device identification, e.g. Device name, IP address, MAC address or such.
  - Currently used network and connectivity settings

*) Dockee should perform short Wi-Fi scanning to detect nearby WLAN networks before sending this information. Credentials are sent to Docking Station only if stored on Dockee, i.e. WLAN network is known to the Dockee.

After receiving gathered Wi-Fi information from the Dockee 100A, the Docking Station 100F may also perform Wi-Fi scanning to ensure that WLAN networks (and Wi-Fi devices attached to that WLAN) are available at the location of the Docking Station. Due to different locations of the Dockee and Docking Station, there may be differences in sensitivity of received Wi-Fi radio signals and the applicable WLAN networks may differ.

After this phase, the Docking Station 100F should have enough information to make proper Wi-Fi connectivity settings in step 360 for the wireless docking environment using the network configuration program 144, which in this example is the Smart Connectivity Setup Protocol. FIGS. 5A to 5E illustrate an example embodiment of a method the Docking Station 100F may use to determine the Wi-Fi connectivity settings for a peripheral device 100E in step 360, using the network configuration program 144. The Wi-Fi connectivity settings determined in step 360 may be buffered in the connectivity settings transmit buffer 148 in the Docking Station 100F.

However, at this point Docking Station 100F may not yet know what wireless peripherals may be added to the docking environment. Thus, the Wi-Fi connectivity settings may need to changed in a later phase to enable connectivity for any additional Wi-Fi peripherals.

The Dockee 100A may have already sent some information on the potential peripherals within WDP_SCS_Request. However, the user may explicitly select what wireless peripherals will be added to the environment in later phases.

Then, in step 362, the Docking Station 100F transmits over link 120, the Wi-Fi connectivity settings from its connectivity settings transmit buffer 148, back to Dockee 100A with the Smart Connectivity Setup Protocol message WDP_SCS_Response. In specific cases, Docking Station 100F may need to define temporary connectivity configurations which are used only during Initial Setup. This Smart Connectivity Setup Protocol WDP_SCS_Response may also include instructions about potential peripherals (listed in Smart Connectivity Setup Protocol WDP_SCS_Request) as whether current connectivity towards that peripheral is still valid. If not valid, then Docking Station 100F may define new connectivity settings for that peripheral and give necessary guidance to the Dockee 100A. But, in general, Docking Station 100F may give guidance for the user (via the Dockee 100A's user interface application) and define settings for the Wi-Fi peripherals, i.e. Wi-Fi configurations used in WPS*).

*) Performing WPS between Dockee 100A and Wi-Fi peripheral 100E may require temporarily closing the Wi-Fi Direct connectivity link 120 towards Docking Station 100F. This would not be necessary in the NFC Connection Handover method. In some cases, IP connectivity and change of Link layer network may require additional breaks.

In step 370, the Dockee device 100A receives the Wi-Fi connectivity settings from the Docking station 100F over link 120. In step 372, the Dockee device 100A may create Wi-Fi connections between itself and peripheral devices, for example the printer 100E, as has been prescribed by the received Wi-Fi connectivity settings.

During step 370, the Docking Station 100F may initiate the setup of Wi-Fi connections on the cases where it can perform it by itself, in accordance with the Wi-Fi connectivity settings.

During step 370, the user may select peripherals, such as the printer 100E, to be added into wireless docking environment. This may be merely selecting peripherals from the Dockee 100A's user interface (where peripherals are already known using Wi-Fi Direct Device Discovery and Service Discovery features, and existing connectivity settings are valid). Then the Dockee 100A may perform a WPS procedure for each Wi-Fi peripheral, using settings and instructions received from the Docking Station 100F. Each added peripheral needs to be reported to the Docking Station 100F with Smart Connectivity Setup Protocol messages WDP_Peripheral_Info_Request/Response in respective steps 374 and 375.

When the user has completed adding more wireless peripherals, then Smart Connectivity Setup Protocol WDP_Complete_Request (and Response) may be exchanged by the Dockee 100A and the Docking Station 100F in respective steps 376 and 378.

After this, the Docking Station 100F may verify whether current Wi-Fi settings are still optimal, and make needed adjustments, if necessary. The Docking Station then completes defining the wireless docking environment in step 380.

If some changes are made, then final Wi-Fi settings are exchanged with Smart Connectivity Setup Protocol WDP_Setup_(Request and) Response in respective steps 382 and 384. However, it may be rare that Wi-Fi settings need to be changed in this phase.

The above example embodiment is merely one of many possible orders and message sequences that may be performed by the Wireless Docking Protocol using network configuration program 144 information. Examples of the network configuration program 144 include the Smart Connectivity Setup Protocol and the Universal Plug and Play (UPnP) Protocol.

Example Network Configuration Programs 144

Smart Connectivity Setup Protocol

In example embodiments of the invention, the step of defining the optimal connections by the Docking Station 100F for one or more of the wireless devices in the wireless docking group, may use the Smart Connectivity Setup Protocol as its network configuration program 144. The Wireless Docking Protocol 142 illustrated in FIG. 3 and described above uses as its network configuration program 144, the Smart Connectivity Setup Protocol.

Smart Connectivity Setup Protocol is used to exchange data in defined formats and rules from the Dockee to the Docking Station so that the Docking Station is able to make optimal connectivity settings. And after defining these settings, Smart Connectivity Setup Protocol is used to carry those settings and additional guidance from Docking Station to Dockee. Additional guidance may include, for example, instructions to perform WPS with a specific peripheral.

The main goals of smart connectivity setup;

Enable optimal connectivity within wireless docking environment

Enable easy and consistent user experience

Smart connectivity setup has the following phases & tasks;

1) Gathering of capabilities of wireless devices and current wireless connectivity environments 2) Composing most optimal connectivity settings for wireless docking with minimum interference to non-wireless docking use cases, e.g. normal Internet connectivity.

3) Configuring Dockee, Docking Station and peripherals to use optimal connectivity settings composed in step 2)

Smart connectivity setup is performed during initial setup of wireless docking environment, and when maintaining of wireless docking environment requires connectivity changes.

Smart Connectivity Setup for Wi-Fi

1) Gathering Device Capabilities and Connectivity Environments

The purpose of this phase is to gather as much information as possible to enable composition of optimal connectivity settings.

First Dock Configurator (Dockee) gathers information on known wireless devices and environments (=networks), e.g. configurations already stored into Dock Configurator.

Then Dock Configurator should scan surrounding environment to search other wireless devices and environments.

After gathering all possible information, the Dockee will send this information to Dock Controller (Docking Station) by using WDP.

The information to be sent to Dock Controller includes;

a. The Wi-Fi Capabilities of the Dock Configurator Itself

Supported Wi-Fi modes; IBSS, P2P . . . .

Supported pairing mechanisms; WPS PBC, WPS PIN, WPS NFC, manual, . . . .

Maximum number of parallel networks (=number of implemented Wi-Fi stacks)

Willingness to disconnect and change IP address b. The Wi-Fi Capabilities of Each Known/Detected Devices which May be Potential Peripherals for the Wireless Docking Environment Device identity Device type [if known]

Supported Wi-Fi modes; IBSS, P2P . . . [If known]

Supported pairing mechanisms; WPS PBC, WPS PIN, WPS NFC, manual, . . . [If known]

Maximum number of parallel networks [If known]

Services provided [If known]

c. The Wi-Fi Status Per Each Available Connection of the Dockee

Connectivity status; attached, is able to connect, or is aware of this network

Network type; P2P, Infrastructure . . . .

Network SSID

Network Credentials [if allowed to share]

IP configuration; IP address, DHCP status, DNS etc. [if known]

d. Known Internet Connections

Interface/network

Information whether connection can be shared

2) Composing Optimal Connectivity Settings

Based on the information received within step 1), and possible with own scanning of surrounding connectivity environment, the Dock Controller defines optimal connectivity architectures and methods for the wireless docking environment.

However, Dock Controller will take account that Dock Configurator (=device performing setup of wireless docking environment) may not be the only user, i.e. the Dockee, for the wireless docking environment. So the environment will be applicable any Dockee that fulfills minimum requirements of the Wireless Docking, see Section 4.

Also in exceptional cases Dock Controller may need to define separate connectivity configurations;

Temporary connectivity configurations used only during the initial setup of the wireless docking environment. This may needed e.g. to enable consistent user experience during initial setup despite of existing connectivity configurations (e.g. Wi-Fi networks established already for other purposes than Wireless Docking)

Final connectivity configurations used during normal Wireless Docking operation.

3) Configuring Dockee, Docking Station and Peripherals

After defining the connectivity for the wireless docking environment, Dock Controller passes configurations to the Dock Configurator. Also Dock Controller may send additional instructions, e.g. how to setup peripheral connectivity if direct connectivity between Dockee and peripheral is required. Based on received information and instructions, Dock Configurator configures itself, and also peripherals to be attached wirelessly to the docking environment.

Standard WPS methods are used to configure peripherals.

Universal Plug and Play (UPnP) Protocol

In example embodiments of the invention, the step of defining the optimal connections by the Docking Station 100F for one or more of the wireless devices in the wireless docking group, may use the Universal Plug and Play (UPnP) Protocol as its network configuration program 144. Universal Plug and Play (UPnP) is a networking architecture that provides compatibility among networking equipment, software and peripherals of vendors who belong to the Universal Plug and Play Forum. UPnP was published as International Standard, ISO/IEC 29341, in December, 2008, incorporated herein by reference.

In an example embodiment of the invention, the Docking Station 100F, the Dockee device 100A, and each peripheral device 100E and access point 100B may include a UPnP capability. A UPnP compatible device from any vendor may dynamically join a network, obtain an IP address, announce its name, and convey its capabilities upon request. A UPnP control point, such as the Dockee Device 100A, is a control device that is capable of discovering and controlling client devices, such as the printer device and the access point, in a network through a program interface, in an example embodiment of the invention.

The UPnP protocol includes the steps of discovery, description, control, event notification, and presentation. In an example embodiment of the invention, after Wi-Fi Direct connection 120 is established between the Dockee device 100A and the Docking Station 100F, the Dockee device 100A collects from a peripheral device, such as the printer, the dynamic settings and credentials of the peripheral device, which the Dockee device 100A then transmits to the Docking station 100F. The dynamic settings and credentials may include an IP address of the peripheral and information on its type (i.e., a printer), its manufacturer, and its model. In an example embodiment of the invention, the UPnP networking discovery may be based on the printer's IP address returned by the Dockee device 100A to the Docking Station 100F. Full device description with a UPnP format may obtained by using a URL address to the actual location of the printer's device, instead. When a device, such as the printer peripheral device, is added to the network, the UPnP discovery protocol allows that device to advertise its services to control points on the network, such as the Dockee device 100A, the Docking Station, and other peripheral devices. The exchange is a discovery message containing essential information about the device or one of its services, for example, its type, identifier, and a pointer to more detailed information. The UPnP discovery protocol is based on the Simple Service Discovery Protocol (SSDP).

In an example embodiment of the invention, the peripheral device may advertise its type (i.e., display, printer, mouse, keyboard, etc.) to the control point, such as the Dockee device 100A. In an example embodiment of the invention, after the Dockee device 100A control point has discovered a peripheral device such as the printer, the Dockee device 100A may retrieve the device's description from a URL address provided by the peripheral device in the discovery message. For each service, the description includes a list of the commands, or actions, to which the service responds. The peripheral may give a description of its capabilities in a UPnP device discovery message to the Dockee device 100A, including carrier type (i.e., Wi-Fi, Bluetooth), data rate requirements, message formats, and the like. The capabilities may also be obtained by the Dockee device 100A accessing a server on the Internet and doing a lookup using the peripheral device's manufacturer and model number information as search keys. The Dockee device 100A then transmits the collected information to the Docking Station 100F.

An Example Application of the Wireless Docking Protocol

The following is an example application of the Wireless Docking Protocol sequence set forth in the sequence diagram of FIG. 3, to the example Scenario 1 depicted in FIG. 2A:

First a normal WPS is performed to setup connectivity (Wi-Fi Direct preferred) over link 120 between Dockee 100A and Docking Station 100F, resulting in the Docking Station 100F becoming the peer-to-peer Group Owner and the Dockee device 100A becoming the peer-to-peer client.

Then the Wireless Docking Protocol in the Dockee device 100A transfers the gathered information over link 120 to the network configuration program 144 in the Docking Station 100F. In this example, the Smart Connectivity Setup Protocol is used as the network configuration program 144.

Dockee 100A sends WDP_SCS_Request over link 120 to the Docking station 100F, including the following information;

Wi-Fi capabilities;
Maximum number of parallel WLAN networks: 1
Supported Wi-Fi modes; <something>
Supported Wi-Fi features: <something>
Wi-Fi status (1):
Network SSID: <Infrastructure network>
Network type, configuration methods: <Infrastructure network settings>
Status (attached, is able to connect, or is aware of this network): is able to connect
Pairing mechanism: WPS (PBC, PIN, NFC), manual, other: <one of these>
IP configuration (IP address, DHCP status, DNS, etc): <something>
Internet connection (1):
Interface/network: network 1 (Infrastructure)
Status: inactive
Can be shared?: yes (Docking Station and peripherals may use that internet connectivity if needed)
Other information like type etc: <something>
Willingness to disconnect and change IP address: yes (this value is example, but recommended for single stack device. And actually IP address has been released already when Wi-Fi Direct connectivity performed towards Docking Station)
Wi-Fi peripheral (1):
Device type: Wi-Fi Printer
Device identification: <something>.
Used network and connectivity settings: network 1 (Infrastructure)

The Docking Station 100F defines the most optimal connectivity settings based on received information.

Important information is that Dockee 100A is single stack and Infrastructure network (the access point 100B) is available (which the Dockee is able to use) and one peripheral (Wi-Fi printer) 100E is accessible through that Infrastructure network. Also that Infrastructure network is used for Internet connectivity.

Docking Station 100F defines the following settings and rules of the Smart Connectivity Setup Protocol for optimal connectivity in the wireless docking environment:

Dockee 100A may continue using new Wi-Fi Direct connection 120 (created in first phase).
Dockee 100A may access towards Internet through this Wi-Fi Direct connection 120 (Dockee may retain current IP address as long as Docking Station 100F acts as a bridge and not routing traffic*)
*) Dockee and/or Docking Station may also implement Mobile IP to minimize effects of connectivity changes to the Internet connectivity.
Peripheral Wi-Fi printer 100E may use current Infrastructure connectivity settings over link 212, however see note below)
New peripherals may use new Wi-Fi Direct network (not any in this scenario)

Then, Docking Station 100F joins to Wi-Fi AP (Infrastructure) over link 214 using Credentials received from the Dockee 100A.

In this scenario the user does not add any unknown Wi-Fi peripherals, thus above Smart Connectivity Setup Protocol settings are final.

Note: There are various aspects which impact on the decision whether to keep existing Infrastructure network links 210 and 212 or new Wi-Fi Direct network link 120 for accessing Wi-Fi peripherals, such as printer 100E.

1) Decision may be based on device type; i.e. how much bandwidth it typically uses, what are delay constraints etc. This decision is basically trade off between avoiding extra WPS procedure (=keep existing connectivity) vs. shortening (=optimizing) route towards peripheral.

In this example scenario, it is assumed that Docking Station 100F keeps the current Wi-Fi printer connectivity link 212 and thus no 'extra' WPS is required towards printer 100E.

2) User decides what peripherals are added to wireless docking environment, and using WPS just for selecting Wi-Fi peripherals is one option.

Figure 1B:
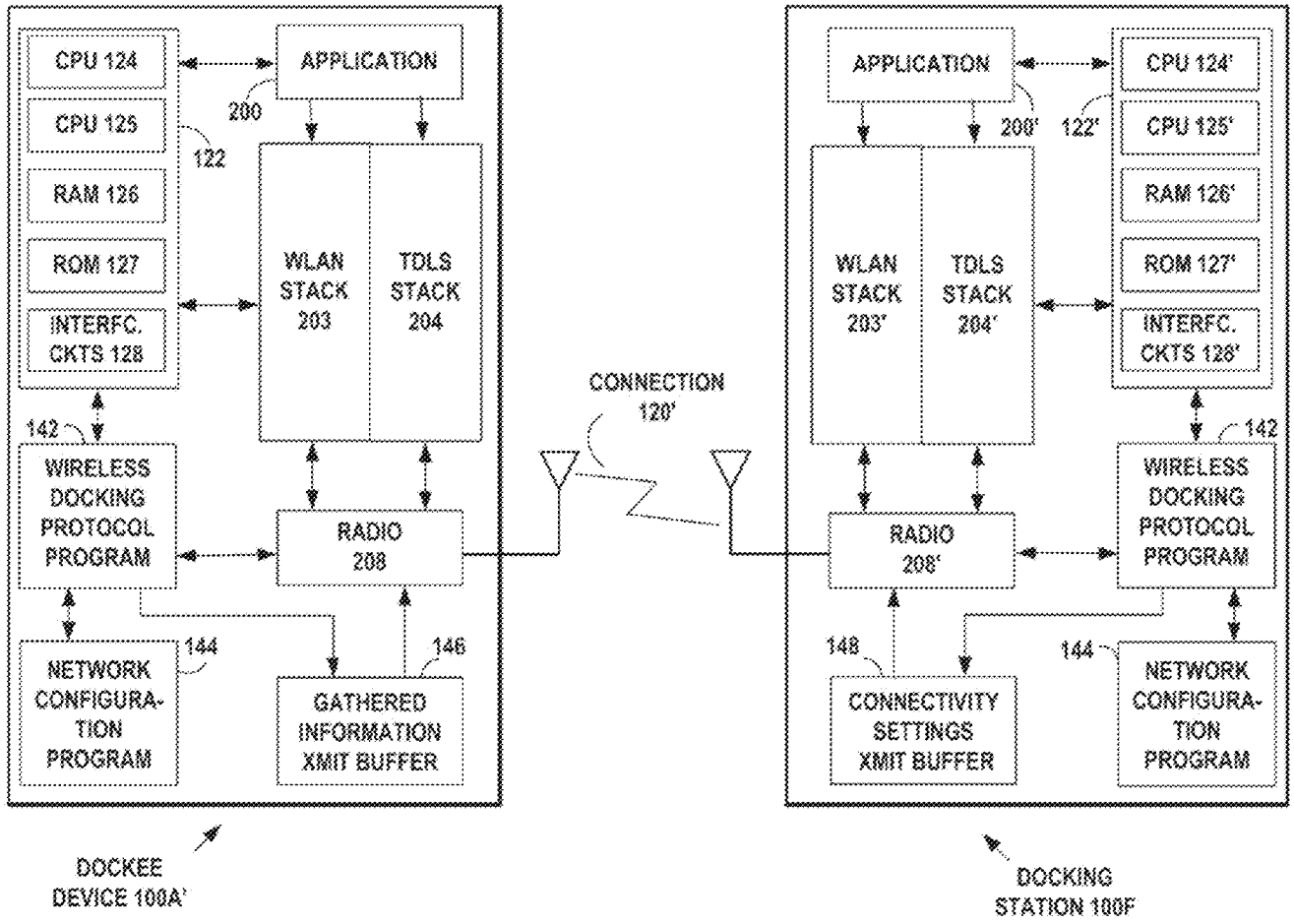
FIG. 1B is an example embodiment of a Dockee device A' comprising a WLAN communications protocol stack and a Tunneled Direct Link Setup communications protocol stack and an example wireless Docking Station device F comprising a WLAN communications protocol stack and a Tunneled Direct Link Setup communications protocol stack, performing a wireless docking procedure over a Tunneled Direct Link Setup communication connection, according to an embodiment of the present invention.

Scenario [1']—Dual Stack Dockee with TDLS and Wi-Fi Direct with Existing Infrastructure Network FIG. 1B is an example embodiment of a Dockee device 100A' comprising a WLAN communications protocol stack 203 and a Tunneled Direct Link Setup communications protocol stack 204 and an example wireless Docking Station device 100F comprising a WLAN communications protocol stack 203' and a Tunneled Direct Link Setup communications protocol stack 204', performing the Wireless Docking Protocol 142 procedure over a Tunneled Direct Link Setup communication connection 120', according to an embodiment of the present invention.

FIG. 2B is a wireless network diagram of an example embodiment, showing a transformation of an existing Wi-Fi infrastructure network configuration of a mobile phone 100A' of FIG. 1B, having a dual protocol stack supporting TDLS and Infrastructure operation modes, with a WLAN communications protocol stack 203 and a Tunneled Direct Link Setup communications protocol stack 204, connected as a client over link 210 to an access point 100B, and a single stack printer 100E that supports Wi-Fi Protected setup, which is also connected over link 212 to the access point 100B, the transformation creating a wireless docking environment by means of a Docking Station 100F of FIG. 1B, having a dual protocol stack supporting TDLS and Infrastructure operation modes, with a WLAN communications protocol stack 203' and one Tunneled Direct Link Setup communications protocol stack 204', performing the Wireless Docking Protocol 142 procedure with the Dockee device 100A to create the wireless docking environment, with the mobile phone 100A' in the role of a Dockee connected over the link 120' to the Docking Station 100F, the printer 100E as a peripheral connected over the existing link 212, and the access point 100B connected over the link 214 to the Docking Station 100F providing Wi-Fi connectivity in the environment, according to an embodiment of the present invention.

In the example embodiment of FIG. 2B, instead of creating a Wi-Fi Direct link between Dockee and Docking Station, a Tunneled Direct Link Setup (TDLS) link 120' is created to enable direct data path between the devices. This direct data path may be needed in wireless display and such technologies.

However, to be able use TDLS both Infrastructure client devices (Dockee) and (Docking Station) need to support TDLS feature (TDLS is transparent to AP and no specific support needed in AP). TDLS may be used by single stack devices, but TDLS requires own channel for TDLS link. So devices supporting TDLS are dual channel capable and thus the simplest Dockee devices do not support TDLS. In general TDLS may considered as an optional feature in case of Wireless Docking.

If both Dockee and Docking Station support TDLS, Docking Station may prefer to use TDLS instead of Wi-Fi Direct.

In the sequence diagram of FIG. 3, the Initial Setup may be a Wi-Fi Protected Setup (WPS) procedure between Dockee and Docking Station, establishing a Wi-Fi Direct link. But this Wi-Fi Direct link would be only a temporary connection used during initial setup. Final connectivity settings would then use Infrastructure and TDLS.

The Docking Station defines the following settings and rules for Smart Connectivity Setup Protocol for optimal connectivity in the wireless docking environment:

Dockee uses existing Infrastructure connection with TDLS.

Dockee accesses towards Internet through Infrastructure connection

Peripheral Wi-Fi printer uses current Infrastructure connectivity settings

New peripherals uses new Infrastructure network (not any in this scenario)

These settings are used after completion of initial setup, i.e. after WDP_Setup_Response message. The Dockee and Docking Station terminate temporary Wi-Fi Direct link and start to use Infrastructure connection with direct TDLS link (actual TDLS link setup is done through Infrastructure connection as specified in TDLS specification).

When using Infrastructure with TDLS, all of the Wi-Fi peripherals should also use Infrastructure network.

Figure 1C:
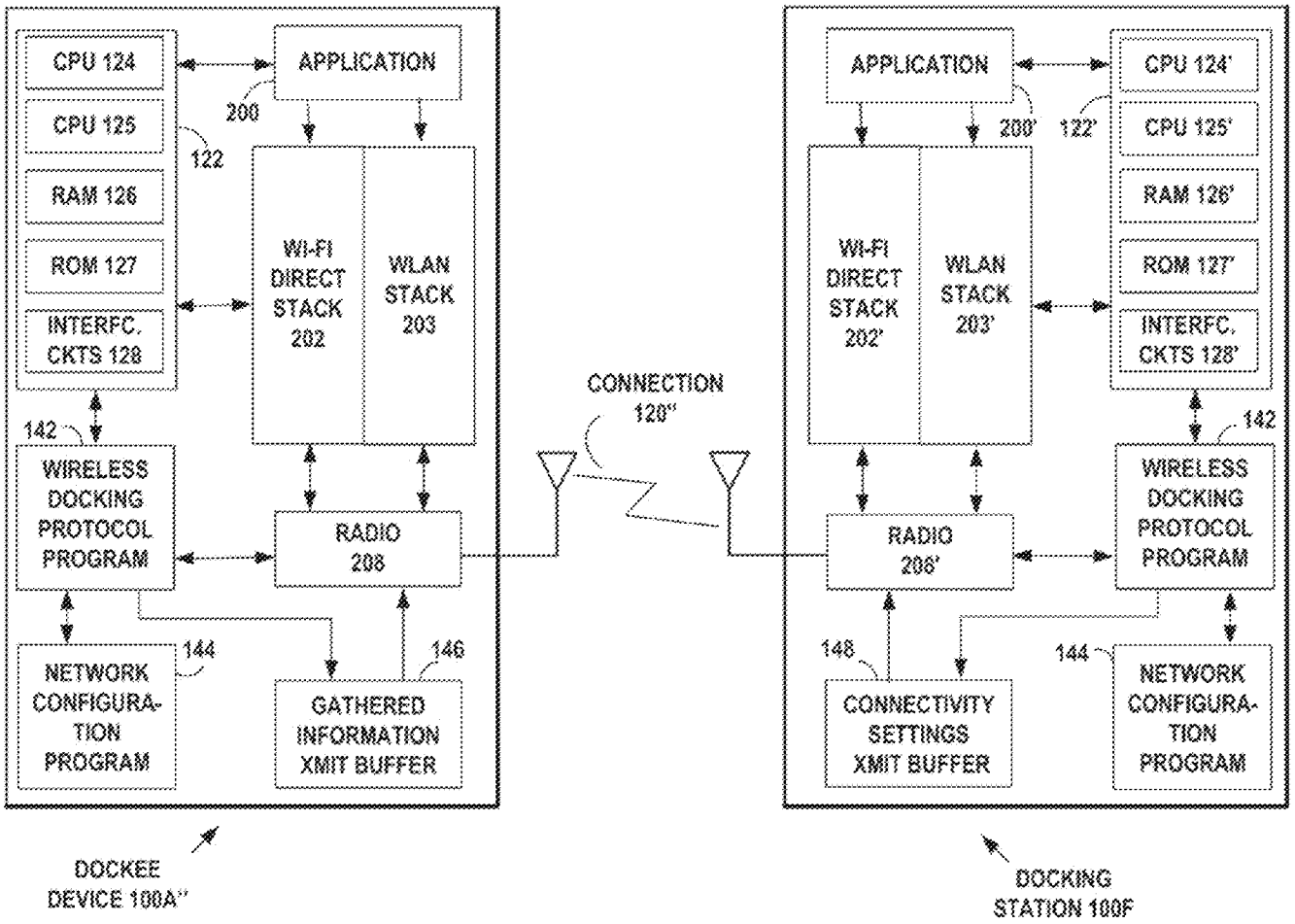
FIG. 1C is an example embodiment of a Dockee device A" comprising a dual Wi-Fi communications protocol stack operating in Wi-Fi Direct and Infrastructure modes and an example wireless Docking Station device F comprising a dual Wi-Fi communications protocol stack operating in Wi-Fi Direct and Infrastructure modes, performing a wireless docking procedure over a Wi-Fi Direct communication connection, according to an embodiment of the present invention.

Scenario [2]—Dual Stack Dockee with Wi-Fi Direct with Existing Infrastructure Network FIG. 1C is an example embodiment of a Dockee device 100A" comprising a dual Wi-Fi communications protocol stack operating in Wi-Fi Direct and Infrastructure modes 202 and 203 and an example wireless Docking Station device 100F comprising a dual Wi-Fi communications protocol stack operating in Wi-Fi Direct and Infrastructure modes 202' and 203', performing the Wireless Docking Protocol 142 procedure over a Wi-Fi Direct communication connection 120", according to an embodiment of the present invention.

FIG. 2C is a wireless network diagram of an example embodiment, showing a transformation of an existing Wi-Fi infrastructure network configuration of a mobile phone 100A" of FIG. 1C, having a dual Wi-Fi communications protocol stack supporting Wi-Fi Direct and Infrastructure operation modes, connected as a client over link 210 to an access point 100B, and a single stack printer 100E that supports Wi-Fi Protected setup, which is also connected over link 212 to the access point 100B, the transformation creating a wireless docking environment by means of a Docking Station 100F of FIG. 1C, having a dual Wi-Fi communications protocol stack supporting Wi-Fi Direct and Infrastructure operation modes, performing the Wireless Docking Protocol 142 procedure with the Dockee 100A" to create the wireless docking environment, with the mobile phone 100A" in the role of a Dockee connected over connection 120" to the Docking station 100F, the printer 100E as a peripheral connected over link 212 to the access point 100B, the Docking Station 100F connected over link 214 to the access point 100B, and the access point 100B providing Wi-Fi connectivity in the environment, according to an embodiment of the present invention.

Assumptions for the Scenario 2:

Mobile phone is dual stack device, and printer is single stack device.

Mobile phone is used to setup wireless docking environment.

In initial state of FIG. 3, the user has created an Infrastructure network with two client devices; mobile phone and printer using two WPS procedures;

Between a mobile phone and an AP

Between a printer and an AP.

Then user buys Docking Station 100F to create wireless docking environment, and user wants to use existing mobile phone 100A", printer 100E and AP 100B for that environment.

Like in scenario 1, direct Wi-Fi link between Dockee and Docking Station is preferred, thus Wi-Fi Direct should be used between those.

However, in this case, mobile phone could keep existing Infrastructure connection towards AP (e.g. Internet connectivity) due dual stack implementation. and actually it is preferred because Internet connectivity would not steal bandwidth from Wi-Fi Direct link, and also delays are shorter (no routing via Docking Station).

Figure 6:
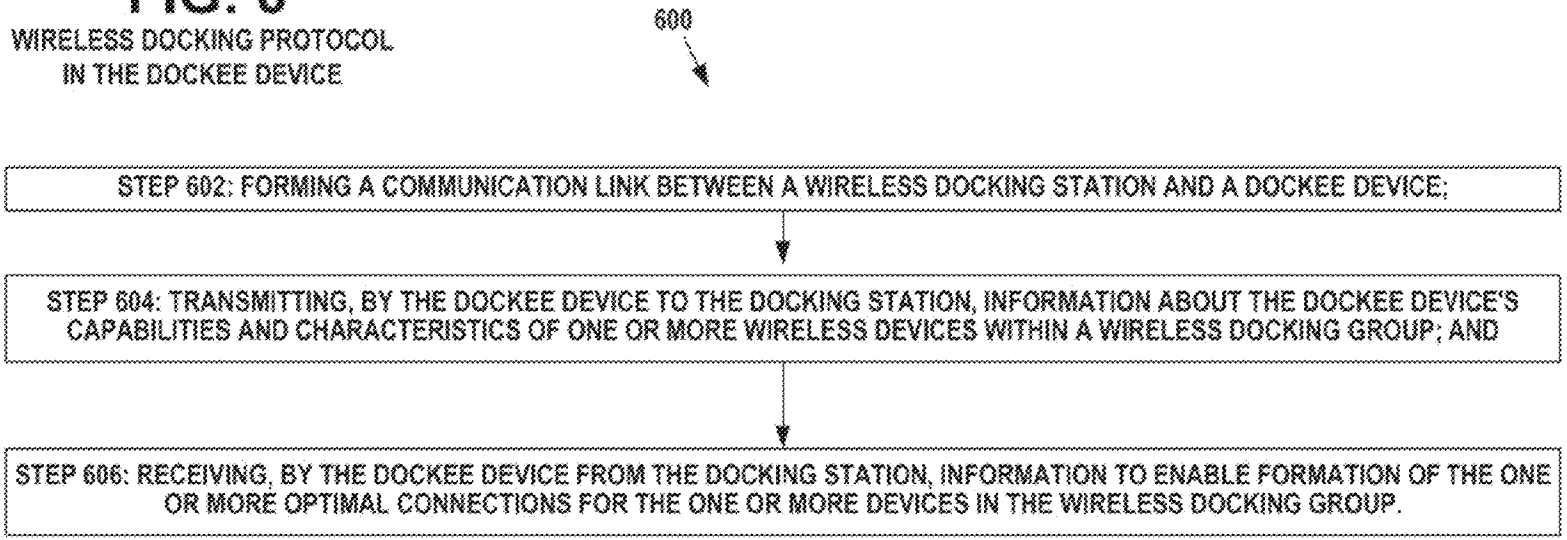
FIG. 6 is an example flow diagram of operational steps of an example embodiment of the Wireless Docking Protocol procedure in the Dockee device, to transmit to the docking station, information it has gathered about the dockee device's capabilities and characteristics of one or more wireless devices within a wireless docking group; and receive from the docking station, information to enable formation of the one or more optimal connections for the one or more devices in the wireless docking group, according to an embodiment of the present invention.

So in this case, the most optimal solution would be just to create additional Wi-Fi Direct link towards Docking Station as shown in lower part of FIG. 6 shows optimal Wi-Fi connectivity after creating wireless docking environment.

But, as said in Scenario 1, this dual connectivity support may not be visible to user, and connectivity setup for wireless docking environment should work same way.

However, Docking Station may be capable to serve also single stack Dockees, thus if Internet connectivity or access to certain Wi-Fi peripheral (that is connected to the AP) is needed for such Dockee, then Docking Station may be able to create Wi-Fi Infrastructure connection between itself and the AP.

Note: If Docking Station would require Internet connectivity by itself, then Infrastructure connection could be created between Docking Station and AP. However, if using traditional method, yet another WPS would be required.

The following is an example application of the Wireless Docking Protocol sequence set forth in the sequence diagram of FIG. 3, to the example Scenario 2 depicted in FIG. 2C:

First a normal WPS is performed to setup connectivity (Wi-Fi Direct preferred) over link 120" between Dockee 100A" and Docking Station 100F, resulting in the Docking Station 100F becoming the peer-to-peer Group Owner and the Dockee device 100A" becoming the peer-to-peer client.

Then the Wireless Docking Protocol transfers the network configuration program 144 information over link 120" from the Dockee device 100A" to the Docking Station 100F. In this example, the Smart Connectivity Setup Protocol is used as the network configuration program 144.

Dockee 100A" sends WDP_SCS_Request over link 120" to Docking station 100F, including the following information;

Wi-Fi capabilities;

Maximum number of parallel WLAN networks: 2

Supported Wi-Fi modes; <something>

Supported Wi-Fi features: <something>

Wi-Fi status (1):

Network SSID: <Infrastructure network>

Network type, configuration methods: <Infrastructure network settings>

Status (attached, is able to connect, or is aware of this network): attached

Pairing mechanism: WPS (PBC, PIN, NFC), manual, other: <one of these>

IP configuration (IP address, DHCP status, DNS, etc): <something>

Internet connection (1):

Interface/network: network 1 (Infrastructure)

Status: active

Can be shared?: yes

Other information like type etc: <something>

Willingness to disconnect and change IP address: no (just example; in dual stack case this value would not typically have any impact)

Wi-Fi peripheral (1):

Device type: Wi-Fi Printer

Device identification: <something>.

Used network and connectivity settings: network 1 (Infrastructure)

Docking Station defines most optimal connectivity settings based on received information.

Important information is that Dockee 100A" is dual stack and Infrastructure network is available and used by the Dockee and peripheral (Wi-Fi printer 100E). Also that Infrastructure network is used for Internet connectivity.

Docking Station 100F defines the following settings and rules for network configuration program 144 for optimal connectivity in the wireless docking environment:

Dockee 100A" may use new Wi-Fi Direct connection 120" only for accessing peripherals attached directly to Docking Station (e.g. remote display, USB devices etc.)

Dockee 100A" may continue accessing Internet by using existing Infrastructure connection 210.

Peripheral Wi-Fi printer 100E may use current Infrastructure connectivity settings over link 212 (no need to perform WPS for reconfiguring Wi-Fi printer)

New peripherals may use new Wi-Fi Direct network (not any in this scenario)

Note: Docking Station 100F joins to Wi-Fi AP (Infrastructure) using Credentials received from the Dockee only when some another single stack Dockee starts to use docking environment, or when Docking Station by itself needs Internet connectivity.

In this scenario user does not add any unknown Wi-Fi peripherals, thus above network configuration program 144 settings are also final ones.

Figure 1D:
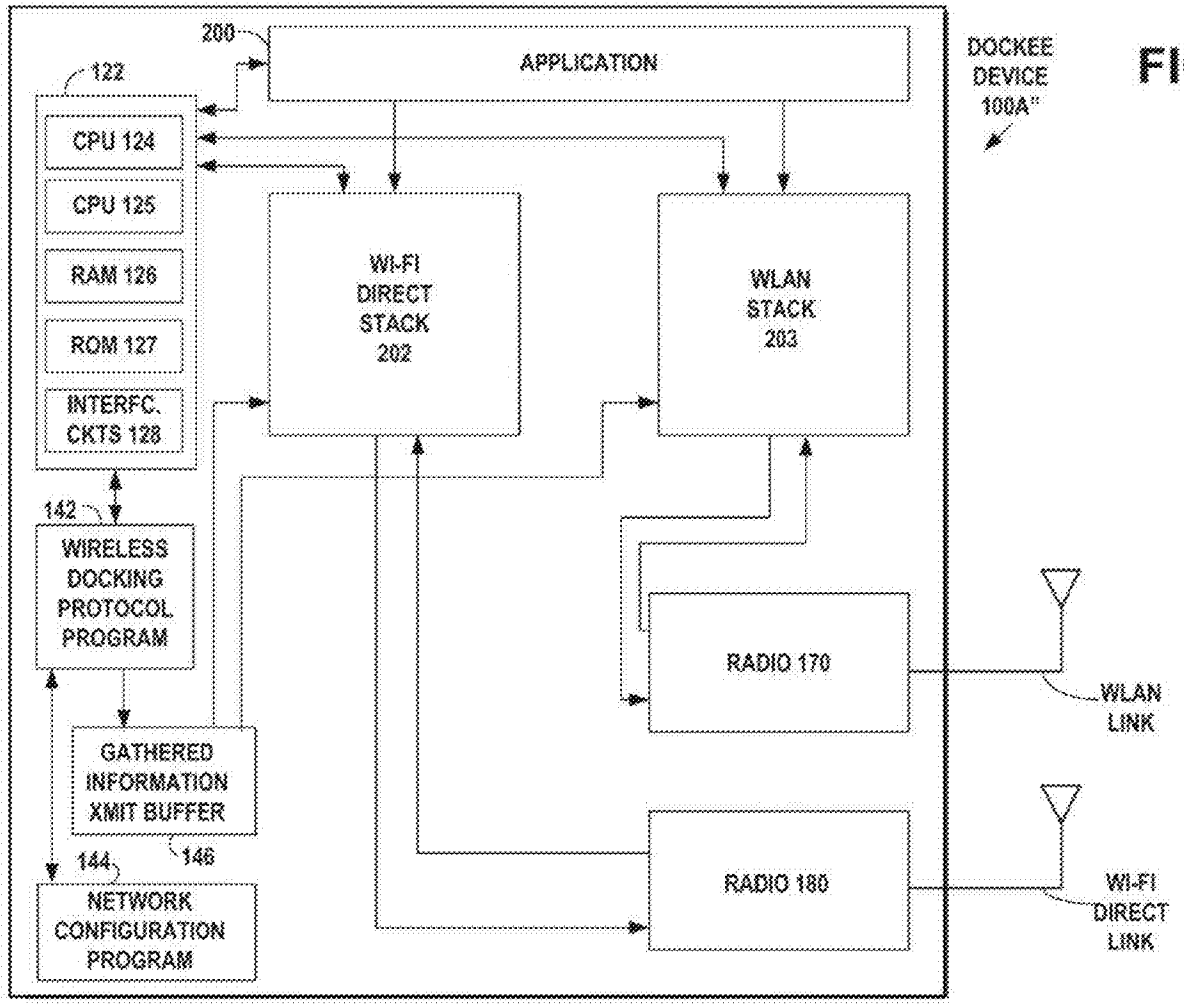
FIG. 1D is an example embodiment of the Dockee device A" of FIG. 1C, comprising an example dual radio embodiment with the dual Wi-Fi communications protocol stack. One protocol stack operates in Wi-Fi Direct mode. The other protocol stack operates in Infrastructure mode. Each protocol stack has its respective digital baseband transmission path outputting its signal to the radio. On the receive side, the respective radio outputs the received signal to the digital baseband transmission path of the respective protocol stack, according to an embodiment of the present invention.

FIG. 1D is an example embodiment of the Dockee device 100A" of FIG. 1C, comprising an example dual radio embodiment with the dual Wi-Fi communications protocol stack 202 and 203. The protocol stack 202 operates in Wi-Fi Direct mode and in example embodiments, may include Wi-Fi Direct upper layer protocols, Wi-Fi Direct logical link layer, and Wi-Fi Direct MAC sublayer. The protocol stack 203 operates in Infrastructure mode and in example embodiments, may include WLAN upper layer protocols, WLAN logical link layer, and WLAN MAC sublayer. Each protocol stack 202 or 203 may have its respective digital baseband transmission path outputting its signal to the respective radio 170 or 180. On the receive side, the respective radio 170 or 180 outputs the received signal to the digital baseband transmission path of the respective protocol stack 202 or 203, according to an embodiment of the present invention.

The example Wi-Fi Direct protocol stack 202 in example embodiments, may have the digital baseband transmission path of the Wi-Fi MAC sublayer output the digital baseband signal through physical layer (PHY) logic to a digital-to-analog converter and transmitter of an example RF radio 180. The modulated output of the RF radio 180 may be amplified by a power amplifier and applied to a transmit/receive switch and the antenna of the Wi-Fi Direct link. In receiving signals on the antenna of the Wi-Fi Direct link, the transmit/receive switch passes the RF signal to the receiver of the RF radio 180 and an analog-to-digital converter. The demodulated digital baseband signal then passes through PHY layer logic to the Wi-Fi Direct MAC sublayer of the Wi-Fi Direct protocol stack 202.

The example WLAN protocol stack 203 in example embodiments, may have the digital baseband transmission path of the WLAN MAC sublayer output the digital baseband signal through physical layer (PHY) logic to a digital-to-analog converter and transmitter of an example RF radio 170. The modulated output of the RF radio 170 may be amplified by a power amplifier and applied to a transmit/receive switch and the antenna of the WLAN link. In receiving signals on the antenna of the WLAN link, the transmit/receive switch passes the RF signal to the receiver of the RF radio 170 and an analog-to-digital converter. The demodulated digital baseband signal then passes through PHY layer logic to the WLAN MAC sublayer of the WLAN protocol stack 203.

Scenario [3]—Single Stack Dockee with Wi-Fi Direct with Existing Wi-Fi Direct Network FIG. 2D is a wireless network diagram of an example embodiment, showing a transformation of an existing Wi-Fi network configuration of a mobile phone 100A of FIG. 1A, having a single Wi-Fi stack supporting Wi-Fi Direct and Infrastructure operation modes, connected over link 216 to a single stack printer that supports Wi-Fi Direct, the transformation creating a wireless docking environment by means of a Docking Station 100F of FIG. 1A, having a dual Wi-Fi stack supporting Wi-Fi Direct and Infrastructure operation modes, performing the Wireless Docking Protocol 142 procedure with the Dockee device 100A to create the wireless docking environment, with the mobile phone 100A in the role of a Dockee connected over link 120 to the Docking Station 100F, the printer 100E as a peripheral connected over link 218 to the Docking Station 100F, and the Docking Station 100F providing Wi-Fi connectivity in the environment, according to an embodiment of the present invention.

Assumptions for the Scenario:

Both clients (mobile phone and printer) are single stack devices. However, there is no AP available.

Mobile phone is used to setup wireless docking environment.

In initial state of FIG. 2D user has created Wi-Fi Direct connectivity over link 216 between mobile phone 100A and printer 100E; either Temporary Wi-Fi Direct connection created by WPS (a new peer-to-peer (P2P) network created every time when needed)

Persistent Wi-Fi Direct connection created by WPS ("always available" P2P network—WPS needed only the first time)

Either of those devices 100A and 100E becomes Group Owner (GO) of the Wi-Fi Direct network (which one is not relevant on this case, mobile phone being P2P GO is just an example)

Then user buys Docking Station 100F to create wireless docking environment, and user wants to use existing mobile phone 100A and printer 100E for that environment.

But, adding a Docking Station as a new P2P client is not optimal, because Docking Station would typically serve multiple Dockees. Docking Station is a 'non-mobile, always on' device, thus it would be much better that Docking Station acts as a P2P GO. Also Docking Station may provide Internet connectivity through Ethernet, thus it would be better that central device of the Wi-Fi Direct network provides Internet connectivity.

Note, that a peer-to-peer Group Owner (P2P GO) is basically an AP with additional capabilities.

Thus, in this case, the most optimal solution may be to create a new Wi-Fi Direct network where Docking Station acts as a P2P GP as shown on the right side of FIG. 2D, after creating a wireless docking environment.

The following is an example application of the Wireless Docking Protocol sequence set forth in the sequence diagram of FIG. 3, to the example scenario depicted in FIG. 2D:

First normal WPS link is formed to setup connectivity (Wi-Fi Direct preferred) over link 120 between Dockee 100A and Docking Station 100F, resulting in the Docking Station 100F becoming the peer-to-peer Group Owner and the Dockee device 100A becoming the peer-to-peer client.

Then, the Wireless Docking Protocol transfers the network configuration program 144 information from the Dockee device 100A to the Docking Station 100F. In this example, the Smart Connectivity Setup Protocol is used as the network configuration program 144.

Dockee 100A sends WDP_SCS_Request over link 120 to Docking station 100F, including the following information;

Wi-Fi capabilities;

Maximum number of parallel WLAN networks: 1

Supported Wi-Fi modes; <something>

Supported Wi-Fi features: <something>

Wi-Fi status (1):

Network SSID: <Wi-Fi Direct network towards printer>

Network type, configuration methods: <Wi-Fi Direct network settings>

Status (attached, is able to connect, or is aware of this network): is able to connect Pairing mechanism: WPS (PBC, PIN, NFC), manual, other: <one of these>

IP configuration (IP address, DHCP status, DNS, etc): <something>

Internet connection (n/a):

Willingness to disconnect and change IP address: n/a

Wi-Fi peripheral (1):

Device type: Wi-Fi Printer

Device identification: <something>.

Used network and connectivity settings: network 1 (Wi-Fi Direct)

Docking Station 100F defines most optimal connectivity settings based on received information.

Important information is that Dockee 100A is single stack and Wi-Fi Direct network link 120 is available (Dockee is able to use that) and one peripheral (Wi-Fi printer 100E) is accessible through that network link 120.

However, in this scenario this original Wi-Fi Direct network 216 is not optimal anymore, thus Docking Station 100F creates new Wi-Fi Direct network 218.

Docking Station 100F defines the following settings and rules for network configuration program 144 for optimal connectivity in the wireless docking environment:

Dockee 100A may continue using new Wi-Fi Direct connection 120 (created in first phase).

Dockee 100A may access Internet by using new Wi-Fi Direct connection 120 (if can be provided by the Docking Station 100F).

Peripheral Wi-Fi printer 100E connectivity settings 216 are not valid anymore (new WPS procedure*) may be performed to reconfigure Wi-Fi printer 100E if that printer is wanted to be a peripheral within docking environment. Dockee gives necessary guidance to user via UI to perform WPS procedure.

*) Preferred solution is that Dockee performs WPS on behalf of Docking Station, i.e. WPS is performed between Dockee and peripheral, but using Wi-Fi settings received from Docking Station. Also in this WPS procedure it may be ensured that peripheral uses Docking Station as peer-to-peer Group Owner (P2P GO). This may require adjusting some identities in WPS procedure. As a secondary alternative, a normal WPS link 218 may be performed directly between peripheral 100E and Docking Station 100F.

New peripherals may use new Wi-Fi Direct network (not any in this scenario)

In this scenario, the user does not add any unknown Wi-Fi peripherals, thus the above network configuration program 144 settings are also final ones.

Scenario [4]—Dual Stack Dockee with Wi-Fi Direct with Existing Wi-Fi Direct and Infrastructure Networks FIG. 2E is a wireless network diagram of an example embodiment, showing a transformation of an existing Wi-Fi infrastructure network configuration of a mobile phone having a dual Wi-Fi communications protocol stack supporting Wi-Fi Direct and Infrastructure operation modes, connected as a client to an access point, connected to a single stack printer that supports Wi-Fi Direct, the transformation creating a wireless docking environment by means of a Docking Station having a dual Wi-Fi communications protocol stack supporting Wi-Fi Direct and Infrastructure operation modes, performing a wireless docking procedure to create the wireless docking environment, with the mobile phone in the role of a Dockee, the printer as a peripheral, and the access point providing Wi-Fi connectivity in the environment, according to an embodiment of the present invention.

FIG. 2E is a wireless network diagram of an example embodiment, showing a transformation of an existing Wi-Fi infrastructure network configuration of a mobile phone 100A" of FIG. 1C, having a dual Wi-Fi communications protocol stack supporting Wi-Fi Direct and Infrastructure operation modes, connected as a client to an access point 100B, and connected to a single stack printer 100E that supports Wi-Fi Direct, the transformation creating a wireless docking environment by means of a Docking Station 100F of FIG. 1C, having a dual Wi-Fi communications protocol stack supporting Wi-Fi Direct and Infrastructure operation modes, performing the Wireless Docking Protocol 142 procedure with the Dockee 100A" to create the wireless docking environment, with the mobile phone 100A" in the role of a Dockee connected over link 120" to the Docking Station 100F, the printer 100E as a peripheral connected over link 224 to the Docking Station 100F, the Dockee 100A" connected over link 226 to the access point 100B and the access point 100B providing Wi-Fi connectivity in the environment, according to an embodiment of the present invention.

Assumptions for the Scenario:

Mobile phone is dual stack device, and printer is single stack device.

In the initial state, the user has created both Wi-Fi Direct and Infrastructure networks requiring two WPS procedures;

Between a mobile phone and an AP to setup Infrastructure connectivity

Between a printer and mobile phone to setup Wi-Fi Direct connectivity.

Even if mobile phone is dual stack device, both stacks are already reserved. However, due reasons described in scenario 3, existing Wi-Fi Direct network is not optimal, and thus a new Wi-Fi Direct network where Docking Station is P2P GO should be created.

But, using existing WPS methods, needed actions to setup such Wi-Fi Direct network is not very obvious for the user. Making WPS between Dockee and Docking Station could be quite obvious, but how user notices to create WPS between printer and Docking Station (printer had already working connectivity). Most obvious method would be device informing user that connection to printer will be broken.

Note: End result as shown in scenario 2 is as well applicable.

However, Docking Station may be capable to serve also single stack Dockees, thus if Internet connectivity is needed for such Dockee, then Docking Station may be able to create Wi-Fi Infrastructure connection between itself and the AP.

Note: If Docking Station would require Internet connectivity by itself, then Infrastructure connection could be created between Docking Station and AP. However, if using traditional method, yet another WPS is required.

The following is an example application of the Wireless Docking Protocol sequence set forth in the sequence diagram of FIG. 3, to the example scenario depicted in FIG. 2E:

First is performed normal WPS to setup connectivity (Wi-Fi Direct preferred) over link 120" between Dockee 100A" and Docking Station 100F, resulting in the Docking Station 100F becoming the peer-to-peer Group Owner and the Dockee device 100A" becoming the peer-to-peer client.

Then the Wireless Docking Protocol transfers the network configuration program 144 information from the Dockee device 100A" to the Docking Station 100F. In this example, the Smart Connectivity Setup Protocol is used as the network configuration program 144.

Dockee 100A" sends WDP_SCS_Request to the Docking Station 100F, including the following information;

Wi-Fi capabilities;

Maximum number of parallel WLAN networks: 2

Supported Wi-Fi modes; <something>

Supported Wi-Fi features: <something>

Wi-Fi status (1):

Network SSID: <Infrastructure network>

Network type, configuration methods: <Infrastructure network settings>

Status (attached, is able to connect, or is aware of this network): attached

Pairing mechanism: WPS (PBC, PIN, NFC), manual, other: <one of these>

IP configuration (IP address, DHCP status, DNS, etc): <something>

Wi-Fi status (2):

Network SSID: <Wi-Fi Direct network>

Network type, configuration methods: <Wi-Fi Direct network settings>

Status (attached, is able to connect, or is aware of this network): is able to connect Pairing mechanism: WPS (PBC, PIN, NFC), manual, other: <one of these>

IP configuration (IP address, DHCP status, DNS, etc): <something>

Internet connection (1):

Interface/network: network 1 (Infrastructure)

Status: active

Can be shared?: yes

Other information like type etc: <something>

Willingness to disconnect and change IP address: no (just example; in dual stack case this value would not typically have any impact)

Wi-Fi peripheral (1):

Device type: Wi-Fi Printer

Device identification: <something>.

Used network and connectivity settings: network 2 (Wi-Fi Direct)

Docking Station 100F defines most optimal connectivity settings based on received information.

Important information is that Dockee 100A" is dual stack and two different networks are used. Infrastructure network with access point 100B is used for Internet connectivity.

Docking Station defines the following settings and rules for network configuration program 144 for optimal connectivity in the wireless docking environment:

Dockee 100A" may use new Wi-Fi Direct connection 120" only for accessing peripherals attached directly to Docking Station 100F (e.g. remote display. USB devices etc.). Also Wi-Fi printer 100E would be attached directly over link 224 to Docking Station 100F in this case.

Dockee 100A" may continue accessing Internet by using existing Infrastructure connection over link 226 to the access point 100B.

Peripheral Wi-Fi printer 100E connectivity settings 220 are not valid anymore (new WPS procedure) may be performed to reconfigure Wi-Fi printer 100E if that printer is wanted to be a peripheral within docking environment. Dockee 100A" gives necessary guidance to user via UI to perform WPS procedure.

New peripherals may use new Wi-Fi Direct network (not any in this scenario)

Note: Docking Station 100F joins to Wi-Fi AP (Infrastructure) using Credentials received from the Dockee 100A" only when some another single stack Dockee starts to use docking environment, or when Docking Station by itself needs Internet connectivity.

In this scenario user does not add any unknown Wi-Fi peripherals, thus above network configuration program 144 settings are also final ones.

Scenario [5]—Single Stack Dockee with Wi-Fi Direct Creating New Docking Environment FIG. 2F is a wireless network diagram of an example embodiment, showing the creation of a wireless docking environment by means of a Docking Station 100F of FIG. 1A, having a dual Wi-Fi stack supporting Wi-Fi Direct and Infrastructure operation modes, performing the Wireless Docking Protocol 142 procedure with dockee device 100A to create the wireless docking environment that includes a mobile phone 100A of FIG. 1A, having a single Wi-Fi stack supporting Wi-Fi Direct and Infrastructure operation modes, which assumes the role of a Dockee, the mobile phone/Dockee 100A forwarding a user indication over link 120 to the Docking Station 100F that a single stack printer 100E that supports Wi-Fi Direct is to be included in the wireless docking environment, the Docking Station 100F providing Wi-Fi connectivity in the environment, according to an embodiment of the present invention.

The Docking Station 100F uses the Wireless Docking Protocol to transfer the network configuration program 144 information from the Dockee device 100A to setup a completely new Wi-Fi connectivity by using only Wi-Fi Direct network. Dockee 100A is single stack device.

User has mobile phone (Dockee) 100A, Wi-Fi printer 100E and Docking Station 100F, but there are no prior Wi-Fi configurations.

The setup starts in step 1 with creation of Wi-Fi Direct network 120 between Dockee 100A and Docking Station 100F (as in other scenarios).

Then Dockee 100A may forward information on its Wi-Fi capabilities and status. However, Wi-Fi status in this case would be very limited.

Dockee 100A sends WDP_SCS_Request to the Docking Station 100F in step 2, including the following information;

Wi-Fi capabilities;

Maximum number of parallel WLAN networks: 1

Supported Wi-Fi modes; <something>

Wi-Fi status (n/a):

Internet connection (n/a):

Willingness to disconnect and change IP address: n/a

Wi-Fi peripheral (n/a):

Docking Station 100F defines most optimal connectivity settings based on received information;

Important information is that Dockee 100A is single stack device. But in this case Docking Station 100F does not have any information about other Wi-Fi networks, thus Docking Station 100F issues commands to use the newly created Wi-Fi Direct network 120 for everything:

Dockee 100A may continue using the new Wi-Fi Direct connection 120 (created in first phase).

Dockee 100A may access Internet by using new Wi-Fi Direct connection 120 (if it can be provided by the Docking Station 100F).

New peripherals may use new Wi-Fi Direct network 120.

The Docking Station 100F also commands the Dockee 100A to perform a new WPS in step 3 towards the peripherals (e.g., printer 100E), since the peripherals need the Credentials of the new Wi-Fi Direct network. Dockee 100A then may perform WPS towards peripherals by using WPS (any method available on the peripheral) in step 3, see details e.g. from scenario 3. Dockee 100A may perform this WPS on behalf of Docking Station 100F*) to create Wi-Fi Direct link 230 in step 4. Dockee 100A gives necessary guidance to user via user interface UI to perform these WPS procedures.

*) This is similar to WPS External Registrar concept.

In this scenario user adds a new Wi-Fi peripheral (printer 100E), but still earlier defined network configuration program 144 settings are optimal and thus the final ones.

Scenario [6]—Dual Stack Dockee with Wi-Fi Direct Creating New Docking Environment FIG. 2G is a wireless network diagram of an example embodiment, showing the creation of a wireless docking environment by means of a Docking Station 100F of FIG. 1C, having a dual Wi-Fi stack supporting Wi-Fi Direct and Infrastructure operation modes, performing the Wireless Docking Protocol 142 procedure with the Dockee device 100A" to create the wireless docking environment that includes a mobile phone 100A" of FIG. 1C, having a dual Wi-Fi communications protocol stack supporting Wi-Fi Direct and Infrastructure operation modes, connected over link 234 as a client to an access point 100B, the mobile phone 100A" assuming the role of a Dockee, the mobile phone/Dockee 100A" forwarding a user indication to the Docking Station 100F over link 120 that a single stack printer 100E that supports Wi-Fi Direct is to be included in the wireless docking environment, the mobile phone/Dockee 100A" providing Wi-Fi connectivity in the environment, according to an embodiment of the present invention.

The Docking Station 100F uses the Wireless Docking Protocol 142 to transfer the network configuration program 144 information from the Dockee device 100A" to setup a completely new Wi-Fi connectivity by using only Wi-Fi Direct network. Dockee 100A" is dual stack device.

User has mobile phone (Dockee) 100A", Wi-Fi printer 100E, Wi-Fi AP 100B and Docking Station 100F, but there are no prior Wi-Fi configurations.

Note: Also Wi-Fi AP 100B is assumed to be 'legacy' device and standard WPS may be used towards AP 100B.

The setup starts with creation in step 1 of Wi-Fi Direct network link 120" between Dockee 100A" and Docking Station 100F (as in other scenarios).

Then Dockee 100A" may forward information on its Wi-Fi capabilities and status in step 2 to the Docking Station 100F. However, Wi-Fi status in this case would be very limited.

Dockee 100A" sends WDP_SCS_Request over link 120" to the Docking Station 100F, including the following information;

Wi-Fi capabilities;

Maximum number of parallel WLAN networks: 2

Supported Wi-Fi modes; <something>

Wi-Fi status (n/a):

Internet connection (n/a):

Willingness to disconnect and change IP address: n/a

Wi-Fi peripheral (n/a):

Docking Station 100F defines the most optimal connectivity settings based on the received information. Important information is that Dockee 100A" is a dual stack device. But in this case Docking Station 100F does not have any information about other Wi-Fi networks*), thus Docking Station 100F issues commands to use the newly created Wi-Fi Direct network link 120" for everything:

*) Docking Station 100F is not aware of Infrastructure network access point 100B or at least does not have credentials of the Infrastructure network, thus it cannot use that network. However, if either Dockee 100A" or Docking Station 100F has detected this Infrastructure network access point 100B by the scanning, then Docking Station 100F may give some guidance to user, e.g. to perform WPS towards AP 100B within WDP_SCS_Response.

Dockee 100A" may continue using new Wi-Fi Direct connection 120" (created in first phase).

Dockee 100A" may access Internet by using new Wi-Fi Direct connection 120" and infrastructure link 236 (if it can be provided by the Docking Station 100F).

New peripherals may use new Wi-Fi Direct network 120".

If the user has performed WPS in step 3 between Dockee 100A and AP 100B, the Dockee should report this to the Docking Station 100F (e.g. within WDP_Complete_Request).

Then Docking Station 100F checks whether initial configurations were optimal (=created Wi-Fi Direct network).

But, in this scenario, only Wi-Fi AP 100B provides Internet Connectivity, thus the Infrastructure network link 234 may be also be used for wireless docking environment. So Docking Station 100F may need to define new rules for network configuration program 144. New settings may be sent within WDP_Setup_Response to the Dockee:

Dockee may use new Wi-Fi Direct connection 120" for accessing peripherals, e.g. printer 100E, attached directly to Docking Station 100F (e.g. remote display, USB devices etc.). Also Wi-Fi printer 100E may be attached directly to Docking Station 100F in this case.

Dockee 100A" may access Internet by using new Infrastructure connection 234.

Figure 4:
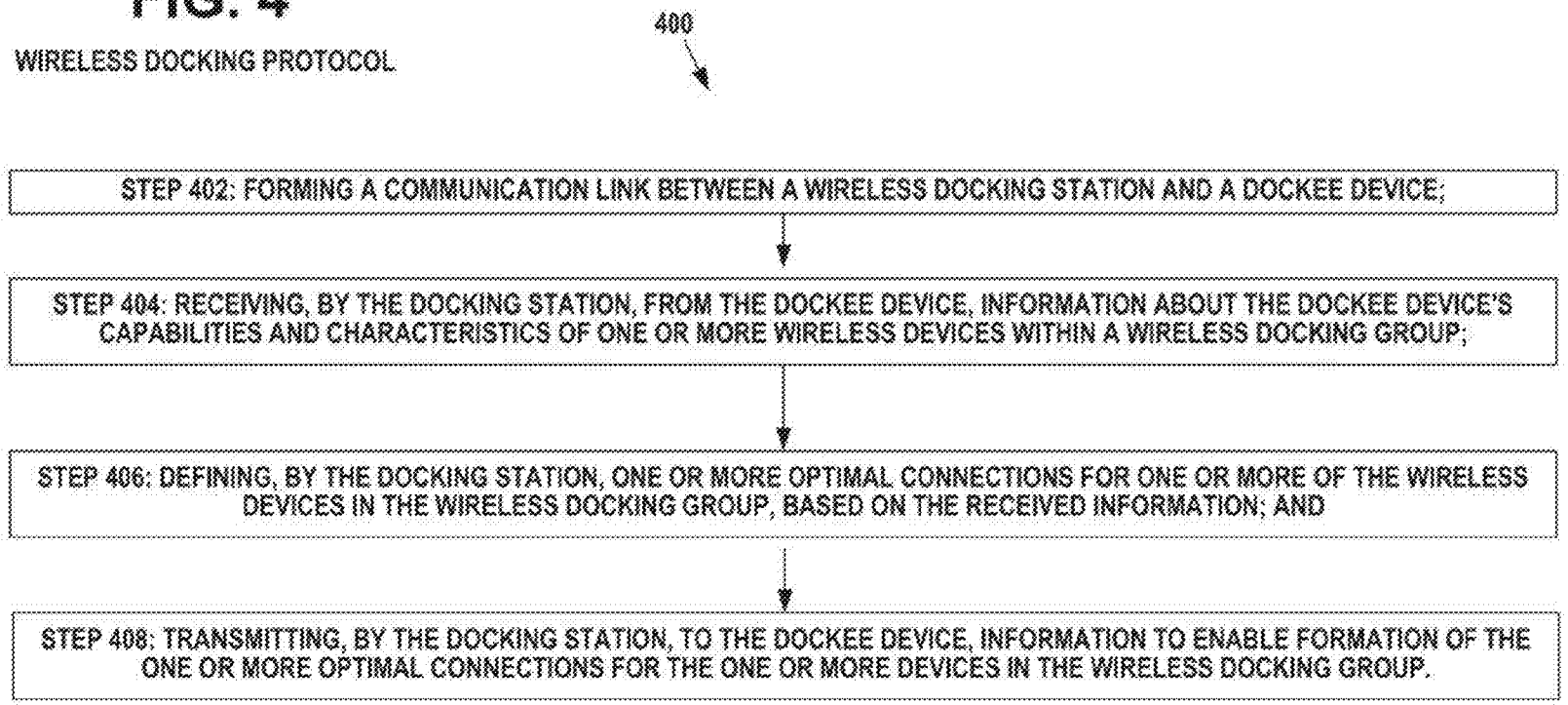
FIG. 4 is an example flow diagram of operational steps of an example embodiment of the Wireless Docking Protocol procedure to create the wireless docking environment, as shown in FIGS. 2A to 2G, according to an embodiment of the present invention.

FIG. 4, is an example flow diagram 400 of operational steps of an example embodiment of the method carried out by the Docking Station 100F in performing the Wireless Docking Protocol 142 to form a wireless docking environment. The steps of the flow diagram 400 represent computer code instructions stored in the RAM and/or ROM memory of the Docking Station device 100F, which when executed by the central processing units (CPU), carry out the functions of the example embodiments of the invention. The steps may be carried out in another order than shown and individual steps may be combined or separated into component steps. Additional steps may be inserted into this sequence. The steps of the example method are as follows.

Step 402: forming a communication link between a wireless docking station and a dockee device;

Step 404: receiving, by the Docking Station, from the Dockee device, information about the Dockee device's capabilities and characteristics of one or more wireless devices within a wireless docking group;

Step 406: defining, by the Docking Station, one or more optimal connections for one or more of the wireless devices in the wireless docking group, based on the received information; and Step 408: transmitting, by the Docking Station, to the Dockee device, information to enable formation of the one or more optimal connections for the one or more devices in the wireless docking group.

FIGS. 5A to 5E are, collectively, an example flow diagram 500 of operational steps of an example embodiment of the Wireless Docking Protocol 142 procedure in the Docking Station 100F, to define the Wi-Fi connectivity settings for a peripheral printer 100E, using the network configuration program 144, according to an embodiment of the present invention. The steps of the flow diagram 500 represent computer code instructions stored in the RAM and/or ROM memory of the Docking Station device 100F, which when executed by the central processing units (CPU), carry out the functions of the example embodiments of the invention. The steps may be carried out in another order than shown and individual steps may be combined or separated into component steps. Additional steps may be inserted into this sequence. The steps of the example method are as follows.

Figure 5A:
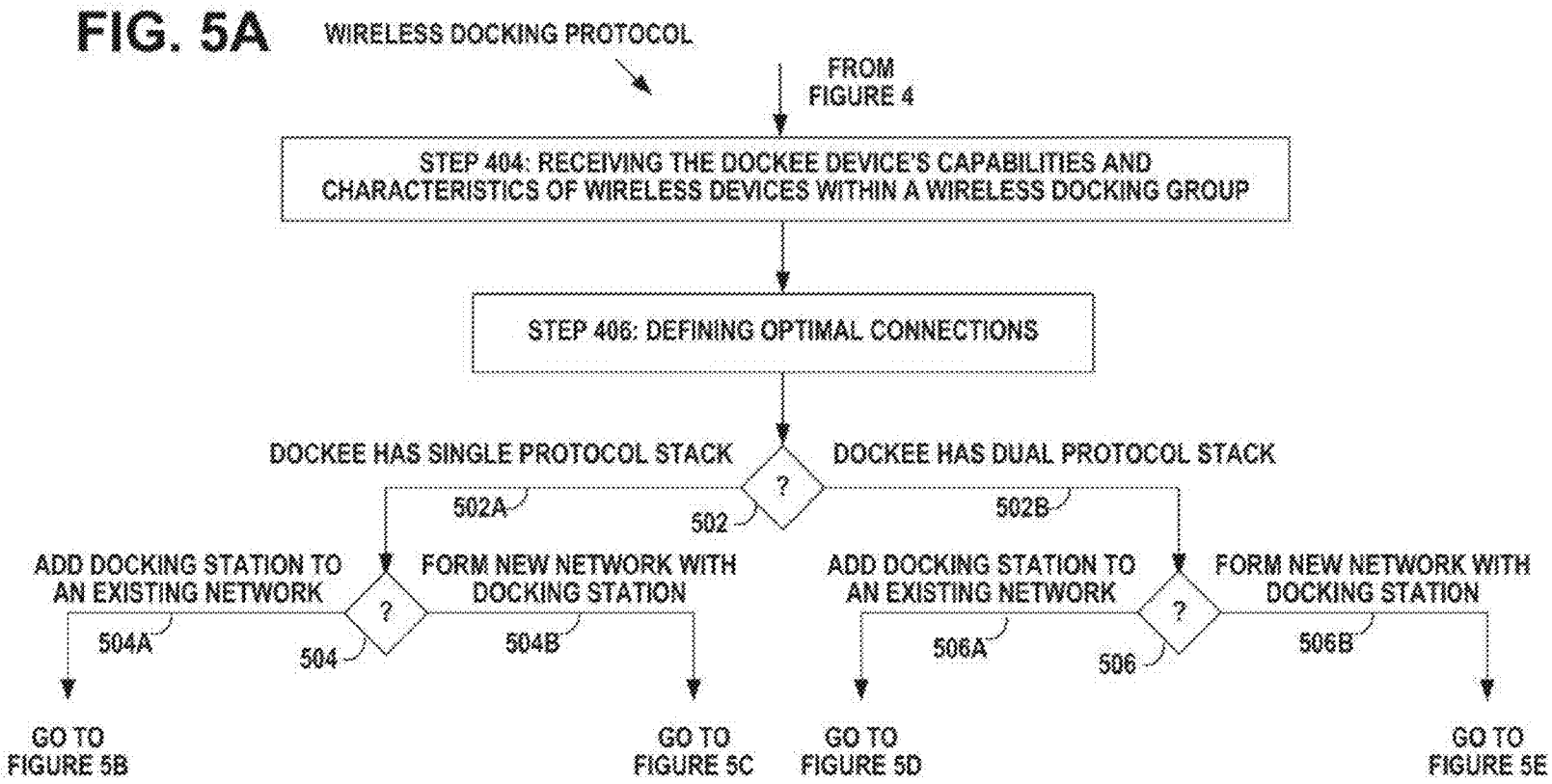
FIGS. 5A to 5E are, collectively, an example flow diagram of operational steps of an example embodiment of the Wireless Docking Protocol procedure in the Docking Station, to define the Wi-Fi connectivity settings for a peripheral device in a wireless docking environment, using the network configuration program, according to an embodiment of the present invention.

FIG. 5A continues the Wireless Docking Protocol 142 procedure of FIG. 4, showing Step 404: receiving the Dockee device's capabilities and characteristics of wireless devices within a wireless docking group and Step 406: defining optimal connections. Step 502 determines whether the Dockee 100A has a single protocol stack on path 502A or a dual protocol stack on path 502B. Path 502A passes to step 504 that determines whether the plan is to add Docking Station 100F to an existing network on path 504A or form new network with Docking Station 100F on path 504B. Path 504A passes to the flow diagram of FIG. 5B and Path 504B passes to the flow diagram of FIG. 5C. Path 502B passes to step 506 that determines whether the plan is to add Docking Station 100F to an existing network on path 506A or form new network with Docking Station 100F on path 506B. Path 506A passes to the flow diagram of FIG. 5D and Path 506B passes to the flow diagram of FIG. 5E.

Figure 5B:
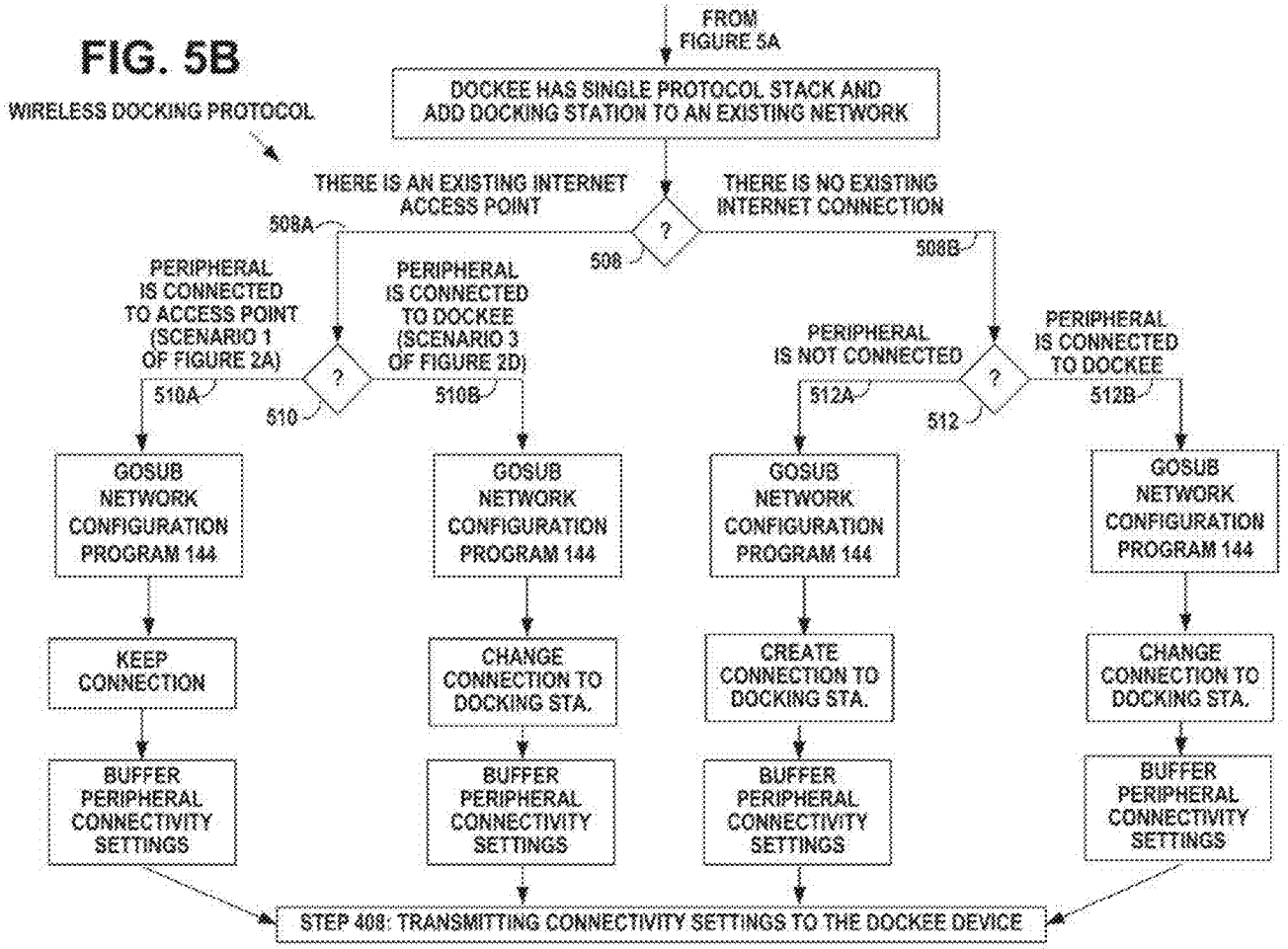

FIG. 5B continues the Wireless Docking Protocol 142 procedure of FIG. 5A, where the Dockee 100A has a single protocol stack and a Docking Station 100F is to be added to an existing network.

Step 508 determines whether there is an existing internet access point 100B on path 508A or there is no existing internet connection on path 508B. Path 508A, there is an existing internet access point 100B, passes to step 510 that determines on path 510A whether the peripheral printer 100E is connected to access point 100B (Scenario 1 of FIG. 2A) or on path 510B whether the peripheral printer 100E is connected to Dockee 100A (Scenario 3 of FIG. 2D).

If the peripheral printer 100E is connected to access point 100B (Scenario 1 of FIG. 2A) on path 510A, then the Wireless Docking Protocol 142 procedure passes the gathered information received from the Dockee device 100A to the Smart Connectivity Setup Protocol subroutine that is used as the network configuration program 144 in this example.

For (Scenario 1 of FIG. 2A) on path 510A, the Docking Station 100F defines the most optimal connectivity settings based on received information.

Important information is that Dockee 100A is single stack and Infrastructure network (the access point 100B) is available (which the Dockee is able to use) and one peripheral (Wi-Fi printer) 100E is accessible through that Infrastructure network. Also that Infrastructure network is used for Internet connectivity.

Docking Station 100F defines the following settings and rules of the Smart Connectivity Setup Protocol for optimal connectivity in the wireless docking environment:

Dockee 100A may continue using new Wi-Fi Direct connection 120 (created in first phase).

Dockee 100A may access towards Internet through this Wi-Fi Direct connection 120 (Dockee may retain current IP address as long as Docking Station 100F acts as a bridge and not routing traffic*)

*) Dockee and/or Docking Station may also implement Mobile IP to minimize effects of connectivity changes to the Internet connectivity.

Peripheral Wi-Fi printer 100E may use current Infrastructure connectivity settings over link 212, however see note below)

New peripherals may use new Wi-Fi Direct network (not any in this scenario)

Then, Docking Station 100F joins to Wi-Fi AP (Infrastructure) over link 214 using Credentials received from the Dockee 100A.

In this scenario the user does not add any unknown Wi-Fi peripherals, thus above Smart Connectivity Setup Protocol settings are final.

Connectivity settings for the peripheral printer 100E are generated by the Smart Connectivity Setup Protocol subroutine and returned. In this example, the network configuration program 144 keeps the connection to the access point 100B.

The Wireless Docking Protocol 142 procedure buffers the connectivity settings for the peripheral printer 100E in the connectivity settings transmit buffer 148 in the Docking Station 100F. The connectivity settings for connecting the peripheral printer 100E to the access point 100B are then transmitted from the Docking Station 100F to the Dockee device 100A in step 408.

If the peripheral printer 100E is connected to Dockee 100A (Scenario 3 of FIG. 2D) on path 510B, then the Wireless Docking Protocol 142 procedure changes the connection to the Docking Station 100F and passes the gathered information received from the Dockee device 100A to the Smart Connectivity Setup Protocol subroutine that is used as the network configuration program 144 in this example.

For (Scenario 3 of FIG. 2D) on path 510B, Docking Station 100F defines most optimal connectivity settings based on received information.

Important information is that Dockee 100A is single stack and Wi-Fi Direct network link 120 is available (Dockee is able to use that) and one peripheral (Wi-Fi printer 100E) is accessible through that network link 120.

However, in this scenario this original Wi-Fi Direct network 216 is not optimal anymore, thus Docking Station 100F creates new Wi-Fi Direct network 218.

Docking Station 100F defines the following settings and rules for network configuration program 144 for optimal connectivity in the wireless docking environment:

Dockee 100A may continue using new Wi-Fi Direct connection 120 (created in first phase).

Dockee 100A may access Internet by using new Wi-Fi Direct connection 120 (if can be provided by the Docking Station 100F).

Peripheral Wi-Fi printer 100E connectivity settings 216 are not valid anymore (new WPS procedure*) may be performed to reconfigure Wi-Fi printer 100E if that printer is wanted to be a peripheral within docking environment. Dockee gives necessary guidance to user via UI to perform WPS procedure.

Connectivity settings for the peripheral printer 100E are generated by the Smart Connectivity Setup Protocol subroutine and returned. The Wireless Docking Protocol 142 procedure buffers the connectivity settings for the peripheral printer 100E in the connectivity settings transmit buffer 148 in the Docking Station 100F. The connectivity settings for connecting the peripheral printer 100E to the Docking Station 100F are then transmitted from the Docking Station 100F to the Dockee device 100A in step 408.

If Step 508 determines that there is no existing internet connection on path 508B, then it passes to step 512 that determines on path 512A whether the peripheral printer 100E is not connected or on path 512B whether the peripheral printer 100E is connected to the Dockee 100A. In both paths, the Wireless Docking Protocol 142 procedure passes the gathered information received from the Dockee device 100A to the Smart Connectivity Setup Protocol subroutine that is used as the network configuration program 144 in this example. Connectivity settings for the peripheral printer 100E are generated by the Smart Connectivity Setup Protocol subroutine and returned. The network configuration program 144 in this example creates a connection to the Docking Station 100F. The Wireless Docking Protocol 142 procedure buffers the connectivity settings for the peripheral printer 100E in the connectivity settings transmit buffer 148 in the Docking Station 100F. The connectivity settings for connecting the peripheral printer 100E to the Docking Station 100F are then transmitted from the Docking Station 100F to the Dockee device 100A in step 408.

Figure 5C:
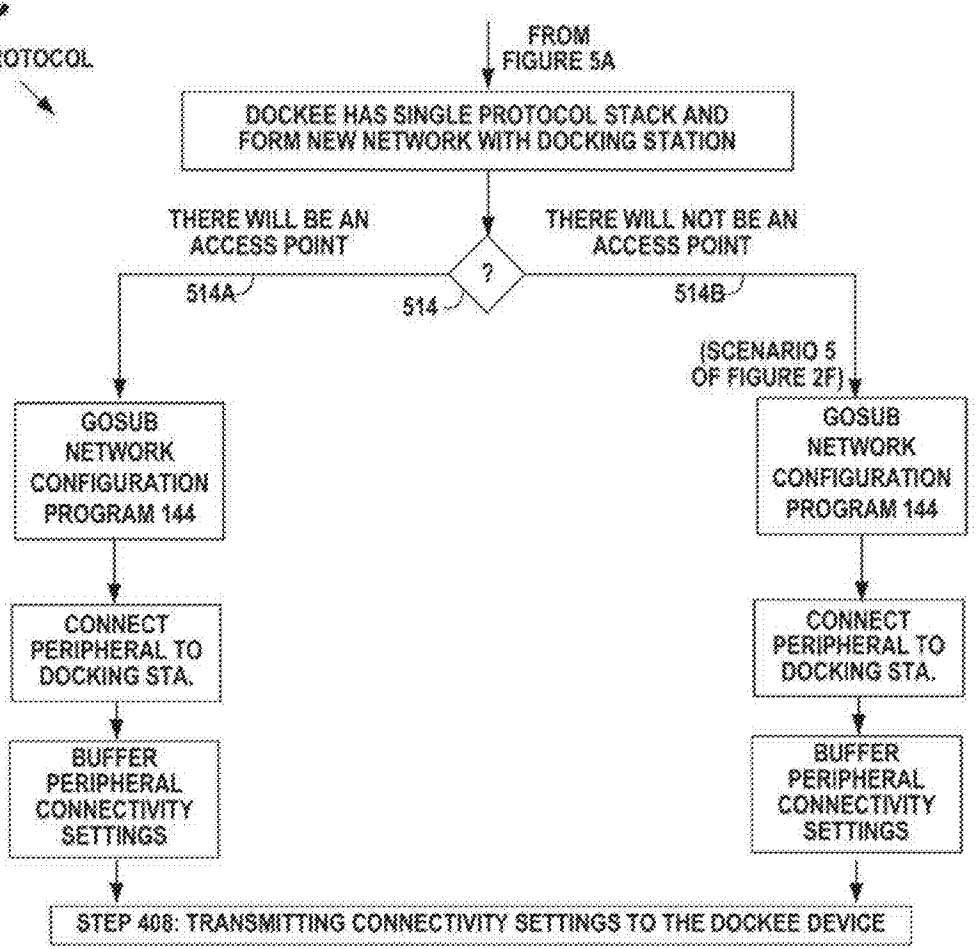

FIG. 5C continues the Wireless Docking Protocol 142 procedure of FIG. 5A, where the Dockee 100A has a dual protocol stack and the plan is to create a new network with the Docking Station 100F. Step 514 determines whether there is an existing internet access point 100B on path 514A or there is no existing internet connection on path 514B (Scenario 5 of FIG. 2F). In both paths, the Wireless Docking Protocol 142 procedure passes the gathered information received from the Dockee device 100A to the Smart Connectivity Setup Protocol subroutine that is used as the network configuration program 144 in this example.

For path 514B (Scenario 5 of FIG. 2F), Docking Station 100F defines most optimal connectivity settings based on received information;

Important information is that Dockee 100A is single stack device. But in this case Docking Station 100F does not have any information about other Wi-Fi networks, thus Docking Station 100F issues commands to use the newly created Wi-Fi Direct network 120 for everything:

Dockee 100A may continue using the new Wi-Fi Direct connection 120 (created in first phase).

Dockee 100A may access Internet by using new Wi-Fi Direct connection 120 (if it can be provided by the Docking Station 100F).

New peripherals may use new Wi-Fi Direct network 120.

The Docking Station 100F also commands the Dockee 100A to perform a new WPS in step 3 towards the peripherals (e.g., printer 100E), since the peripherals need the Credentials of the new Wi-Fi Direct network. Dockee 100A then may perform WPS towards peripherals by using WPS (any method available on the peripheral) in step 3, see details e.g. from scenario 3. Dockee 100A may perform this WPS on behalf of Docking Station 100F*) to create Wi-Fi Direct link 230 in step 4. Dockee 100A gives necessary guidance to user via user interface UI to perform these WPS procedures.

The Smart Connectivity Setup Protocol subroutine creates a connection to the Docking Station 100F. Connectivity settings for the peripheral printer 100E are generated by the Smart Connectivity Setup Protocol subroutine and returned. The Wireless Docking Protocol 142 procedure buffers the connectivity settings for the peripheral printer 100E in the connectivity settings transmit buffer 148 in the Docking Station 100F. The connectivity settings for connecting the peripheral printer 100E to the Docking Station 100F are then transmitted from the Docking Station 100F to the Dockee device 100A in step 408.

Figure 5D:
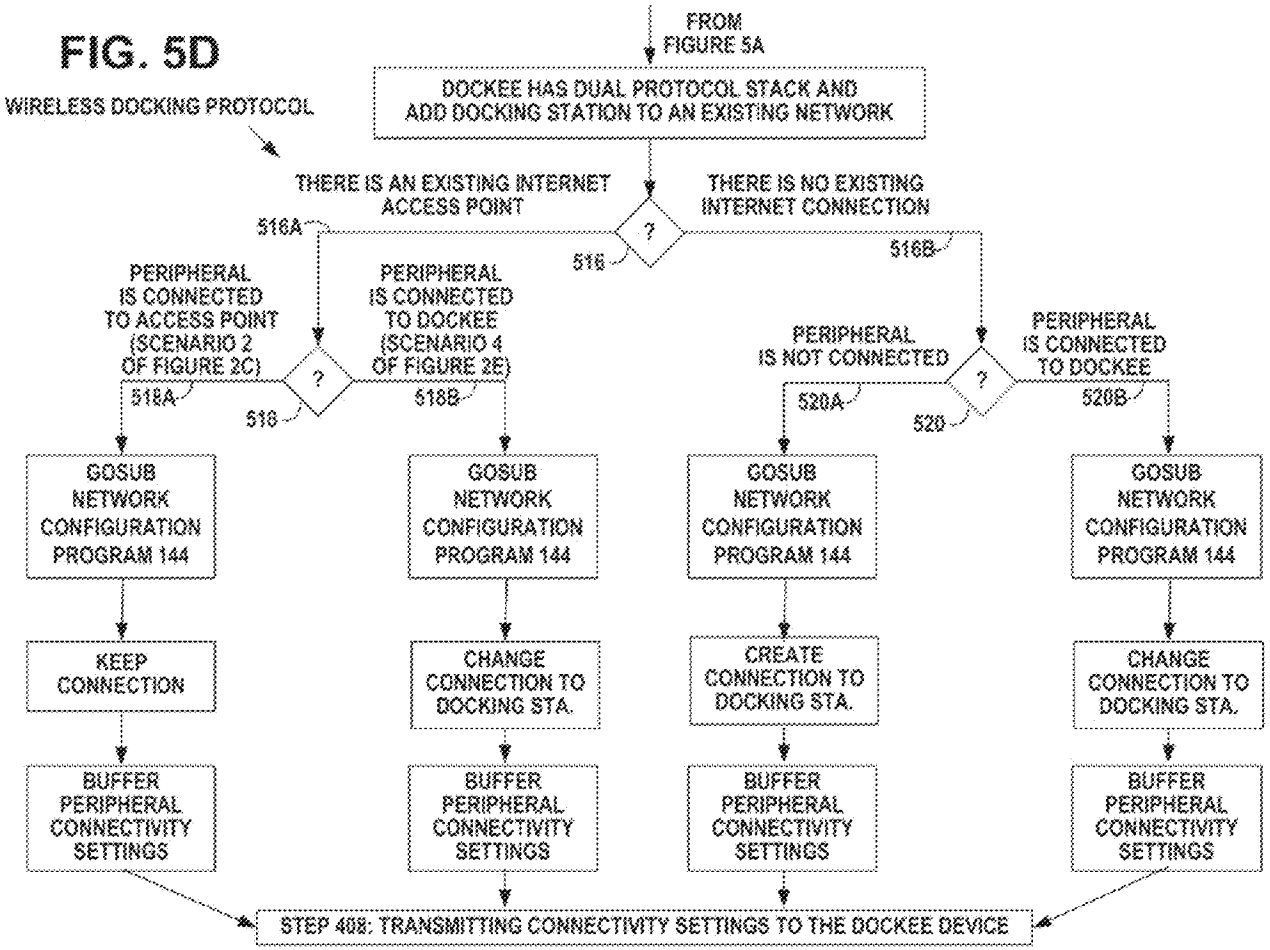

FIG. 5D continues the Wireless Docking Protocol 142 procedure of FIG. 5A, where the Dockee 100A has a dual protocol stack and a Docking Station 100F is to be added to an existing network.

Step 516 determines whether there is an existing internet access point 100B on path 516A or there is no existing internet connection on path 516B. Path 516A, there is an existing internet access point 100B, passes to step 518 that determines on path 518A whether the peripheral printer 100E is connected to access point 100B (Scenario 2 of FIG. 2C) or on path 518B whether the peripheral printer 100E is connected to Dockee 100A (Scenario 4 of FIG. 2E).

If the peripheral printer 100E is connected to access point 100B (Scenario 2 of FIG. 2C) on path 518A, then the Wireless Docking Protocol 142 procedure passes the gathered information received from the Dockee device 100A to the Smart Connectivity Setup Protocol subroutine that is used as the network configuration program 144 in this example.

For (Scenario 2 of FIG. 2C) on path 518A, Docking Station defines most optimal connectivity settings based on received information.

Important information is that Dockee 100A" is dual stack and Infrastructure network is available and used by the Dockee and peripheral (Wi-Fi printer 100E). Also that Infrastructure network is used for Internet connectivity.

Docking Station 100F defines the following settings and rules for network configuration program 144 for optimal connectivity in the wireless docking environment:

Dockee 100A" may use new Wi-Fi Direct connection 120" only for accessing peripherals attached directly to Docking Station (e.g. remote display, USB devices etc.)

Dockee 100A" may continue accessing Internet by using existing Infrastructure connection 210.

Peripheral Wi-Fi printer 100E may use current Infrastructure connectivity settings over link 212 (no need to perform WPS for reconfiguring Wi-Fi printer)

New peripherals may use new Wi-Fi Direct network (not any in this scenario)

Note: Docking Station 100F joins to Wi-Fi AP (Infrastructure) using Credentials received from the Dockee only when some another single stack Dockee starts to use docking environment, or when Docking Station by itself needs Internet connectivity.

In this scenario user does not add any unknown Wi-Fi peripherals, thus above network configuration program 144 settings are also final ones.

The Smart Connectivity Setup Protocol subroutine keeps the connection to the access point 100B. Connectivity settings for the peripheral printer 100E are generated by the Smart Connectivity Setup Protocol subroutine and returned. The Wireless Docking Protocol 142 procedure buffers the connectivity settings for the peripheral printer 100E in the connectivity settings transmit buffer 148 in the Docking Station 100F. The connectivity settings for connecting the peripheral printer 100E to the access point 100B are then transmitted from the Docking Station 100F to the Dockee device 100A in step 408.

If the peripheral printer 100E is connected to Dockee 100A (Scenario 4 of FIG. 2E) on path 518B, then the Wireless Docking Protocol 142 procedure passes the gathered information received from the Dockee device 100A to the Smart Connectivity Setup Protocol subroutine that is used as the network configuration program 144 in this example.

For (Scenario 4 of FIG. 2E) on path 518B, Docking Station 100F defines most optimal connectivity settings based on received information.

Important information is that Dockee 100A" is dual stack and two different networks are used. Infrastructure network with access point 100B is used for Internet connectivity.

Docking Station defines the following settings and rules for network configuration program 144 for optimal connectivity in the wireless docking environment:

- Dockee 100A" may use new Wi-Fi Direct connection 120" only for accessing peripherals attached directly to Docking Station 100F (e.g. remote display, USB devices etc.). Also Wi-Fi printer 100E would be attached directly over link 224 to Docking Station 100F in this case.
- Dockee 100A" may continue accessing Internet by using existing Infrastructure connection over link 226 to the access point 100B.
- Peripheral Wi-Fi printer 100E connectivity settings 220 are not valid anymore (new WPS procedure) may be performed to reconfigure Wi-Fi printer 100E if that printer is wanted to be a peripheral within docking environment. Dockee 100A" gives necessary guidance to user via UI to perform WPS procedure.
- New peripherals may use new Wi-Fi Direct network (not any in this scenario)

Note: Docking Station 100F joins to Wi-Fi AP (Infrastructure) using Credentials received from the Dockee 100A" only when some another single stack Dockee starts to use docking environment, or when Docking Station by itself needs Internet connectivity.

In this scenario user does not add any unknown Wi-Fi peripherals, thus above network configuration program 144 settings are also final ones.

The Smart Connectivity Setup Protocol subroutine changes the connection to the Docking Station 100F. Connectivity settings for the peripheral printer 100E are generated by the Smart Connectivity Setup Protocol subroutine and returned. The Wireless Docking Protocol 142 procedure buffers the connectivity settings for the peripheral printer 100E in the connectivity settings transmit buffer 148 in the Docking Station 100F. The connectivity settings for connecting the peripheral printer 100E to the Docking Station 100F are then transmitted from the Docking Station 100F to the Dockee device 100A in step 408.

If Step 516 determines that there is no existing internet connection on path 516B, then it passes to step 520 that determines on path 520A whether the peripheral printer 100E is not connected or on path 520B whether the peripheral printer 100E is connected to the Dockee 100A. In both paths, the Wireless Docking Protocol 142 procedure passes the gathered information received from the Dockee device 100A to the Smart Connectivity Setup Protocol subroutine that is used as the network configuration program 144 in this example.

The Smart Connectivity Setup Protocol subroutine creates a connection to the Docking Station 100F. Connectivity settings for the peripheral printer 100E are generated by the Smart Connectivity Setup Protocol subroutine and returned. The Wireless Docking Protocol 142 procedure buffers the connectivity settings for the peripheral printer 100E in the connectivity settings transmit buffer 148 in the Docking Station 100F. The connectivity settings for connecting the peripheral printer 100E to the Docking Station 100F are then transmitted from the Docking Station 100F to the Dockee device 100A in step 408.

Figure 5E:
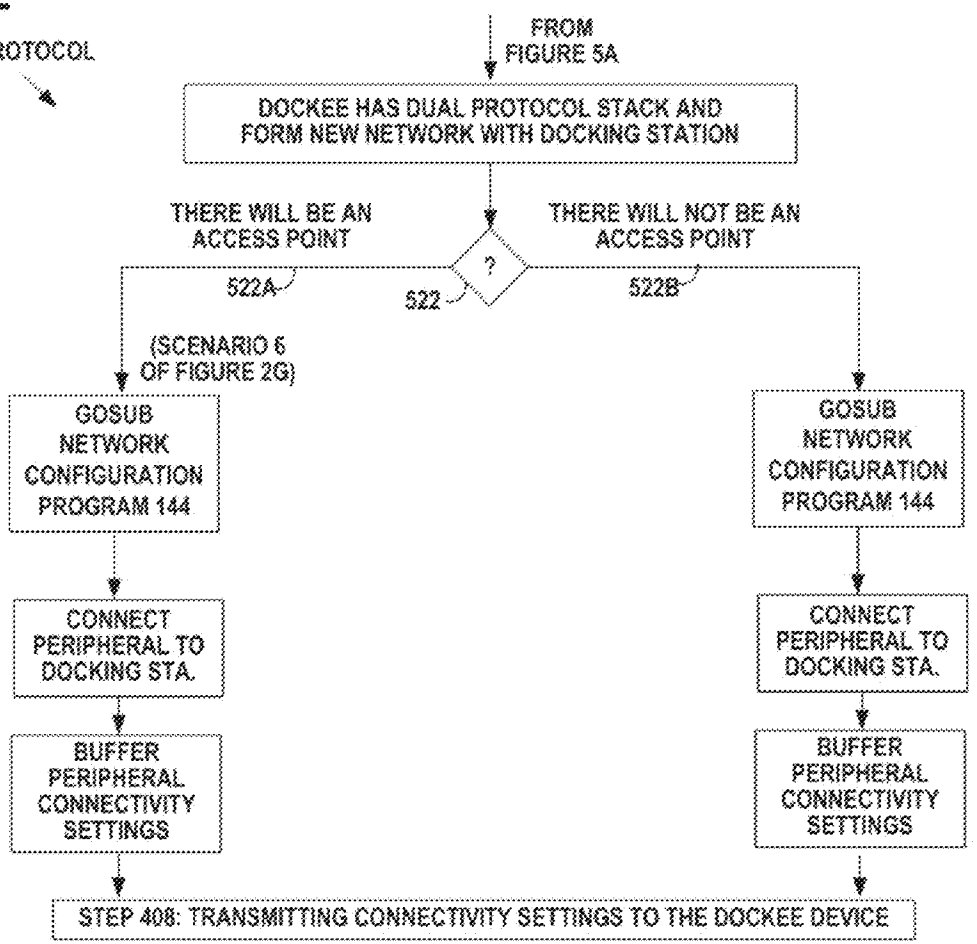

FIG. 5E continues the Wireless Docking Protocol 142 procedure of FIG. 5A, where the Dockee 100A has a dual protocol stack and the plan is to create a new network with the Docking Station 100F. Step 522 determines whether there is an existing internet access point 100B on path 522A (Scenario 6 of FIG. 2G) or there is no existing internet connection on path 522B. In both paths, the Wireless Docking Protocol 142 procedure passes the gathered information received from the Dockee device 100A to the Smart Connectivity Setup Protocol subroutine that is used as the network configuration program 144 in this example.

For path 522A (Scenario 6 of FIG. 2G), Docking Station 100F defines the most optimal connectivity settings based on the received information. Important information is that Dockee 100A" is a dual stack device. But in this case Docking Station 100F does not have any information about other Wi-Fi networks*), thus Docking Station 100F issues commands to use the newly created Wi-Fi Direct network link 120" for everything:

*) Docking Station 100F is not aware of Infrastructure network access point 100B or at least does not have credentials of the Infrastructure network, thus it cannot use that network. However, if either Dockee 100A" or Docking Station 100F has detected this Infrastructure network access point 100B by the scanning, then Docking Station 100F may give some guidance to user, e.g. to perform WPS towards AP 100B within WDP_SCS_Response.

- Dockee 100A" may continue using new Wi-Fi Direct connection 120" (created in first phase).
- Dockee 100A" may access Internet by using new Wi-Fi Direct connection 120" and infrastructure link 236 (if it can be provided by the Docking Station 100F).
- New peripherals may use new Wi-Fi Direct network 120".

If the user has performed WPS in step 3 between Dockee 100A and AP 100B, the Dockee should report this to the Docking Station 100F (e.g. within WDP_Complete_Request).

Then Docking Station 100F checks whether initial configurations were optimal (=created Wi-Fi Direct network).

But, in this scenario, only Wi-Fi AP 100B provides Internet Connectivity, thus the Infrastructure network link 234 may be also be used for wireless docking environment. So Docking Station 100F may need to define new rules for network configuration program 144. New settings may be sent within WDP_Setup_Response to the Dockee:

- Dockee may use new Wi-Fi Direct connection 120" for accessing peripherals, e.g. printer 100E, attached directly to Docking Station 100F (e.g. remote display, USB devices etc.). Also Wi-Fi printer 100E may be attached directly to Docking Station 100F in this case.
- Dockee 100A" may access Internet by using new Infrastructure connection 234.

The Smart Connectivity Setup Protocol subroutine creates a connection to the Docking Station 100F. Connectivity settings for the peripheral printer 100E are generated by the Smart Connectivity Setup Protocol subroutine and returned. The Wireless Docking Protocol 142 procedure buffers the connectivity settings for the peripheral printer 100E in the connectivity settings transmit buffer 148 in the Docking Station 100F. The connectivity settings for connecting the peripheral printer 100E to the Docking Station 100F are then transmitted from the Docking Station 100F to the Dockee device 100A in step 408.

Wireless Docking Protocol in the Dockee Device

In example embodiments of the invention, the Docking Station 100F may use the Smart Connectivity Setup protocol to command the Dockee device 100A to perform a Wi-Fi Protected Setup (WPS) procedure with certain peripheral devices. The Smart Connectivity Setup protocol within the Dockee, for example in a mobile phone, may either provide instructions to the user on a user interface, when human action is needed or alternately may automatically take needed actions without user interaction, when possible.

The Dockee device 100A and the Docking Station 100F are Wi-Fi Direct-devices that may create peer-to-peer connections between themselves and other Wi-Fi Direct devices. Wi-Fi Direct Device Discovery and Service Discovery features allow the Dockee device 100A to identify available devices and services, such as the printer 100E, and report them to the Docking Station 100F before establishing a connection. The Dockee device 100A and the Docking Station 100F may use Wi-Fi Protected Setup to create connections between devices.

In the Wireless Docking Protocol 142, the Docking Station 100F will be the Group Owner (GO) that manages the Group that includes the Dockee 100A and peripherals, such as the printer 100E. Both the Dockee device 100A and the Docking Station 100F include a Wi-Fi Protected Setup Internal Registrar functionality for communication between Clients in the Group.

In the Wireless Docking Protocol 142, the Dockee device 100A and the Docking Station 100F support Discovery mechanisms. Device Discovery is used by the Dockee device 100A to identify other Wi-Fi Direct devices by using a scan similar to that used to discover infrastructure access points. Wi-Fi Protected Setup may be used to obtain credentials and authenticate other Wi-Fi Direct devices. Service Discovery enables the Dockee device 100A to receive advertisements of services supported by higher layer applications of other Wi-Fi Direct devices, such as printer 100E. Service Discovery may be performed at any time (e.g. even before a connection is formed) with any other discovered Wi-Fi Direct device.

FIG. 6 is an example flow diagram 600 of operational steps of an example embodiment of the Wireless Docking Protocol 142 procedure in the Dockee device 100A, to transmit to the docking station, information it has gathered about the dockee device's capabilities and characteristics of one or more wireless devices within a wireless docking group; and receive from the docking station, information to enable formation of the one or more optimal connections for the one or more devices in the wireless docking group, according to an embodiment of the present invention. The steps of the flow diagram 600 represent computer code instructions stored in the RAM and/or ROM memory of the Dockee device 100A, which when executed by the central processing units (CPU), carry out the functions of the example embodiments of the invention. The steps may be carried out in another order than shown and individual steps may be combined or separated into component steps. Additional steps may be inserted into this sequence. The steps of the example method are as follows.

Step 602: forming a communication link between a wireless docking station and a dockee device;

Step 604: transmitting, by the dockee device to the docking station, information about the dockee device's capabilities and characteristics of one or more wireless devices within a wireless docking group; and Step 606: receiving, by the dockee device from the docking station, information to enable formation of the one or more optimal connections for the one or more devices in the wireless docking group.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:

forming a *wireless* communication link between a wireless docking station and a dockee device;

receiving, by the *wireless* docking station, from the dockee device *through the wireless communication link*, information about (*i*) the dockee device's capabilities and (*ii*) characteristics of one or more wireless devices within a wireless docking group*, the dockee device different from the one or more wireless devices*;

defining, by the *wireless* docking station, one or more [optimal] connections for *the* one or more [of the] wireless devices in the wireless docking group, based on the received information; and transmitting, by the *wireless* docking station, to the dockee device *through the wireless communication link*, information to enable formation of the one or more [optimal] connections for the one or more *wireless* devices in the wireless docking group.

2. The method of claim 1, wherein the information *about* (*i*) *the dockee device's capabilities and* (*ii*) *the characteristics of the one or more wireless devices* is communicated using a docking protocol.

3. The method of claim 1, which further comprises:

joining, by the wireless docking station, an infrastructure network having an access point, using a first protocol stack and forming a peer-to-peer connection with the dockee device, using a second protocol stack.

4. The method of claim 1, which further comprises: forming, by the wireless docking station, direct connections with at least one of the one or more *wireless* devices, based on the defined [optimal] connections.

5. The method of claim 1, wherein the *wireless* communication link with the dockee device is a Wi-Fi direct network.

6. The method of claim 1, wherein the *wireless* communication link with the dockee device is a Tunneled Direct Link Setup connection.

7. An apparatus, comprising:

at least one processor; at least one memory including computer program code;

the at least one memory and the computer program code configured to, with the at least one processor, cause the apparatus at least to:

form a *wireless* communication link with a dockee device;

receive from the dockee device *through the wireless communication link*, information about (*i*) the dockee device's capabilities and (*ii*) characteristics of one or more wireless devices within a wireless docking group, *the dockee device different from the one or more wireless devices*;

define one or more [optimal] connections for *the* one or more [of the] wireless devices in the wireless docking group, based on the received information; and transmit to the dockee device *through the wireless communication link*, information to enable formation of the one or more [optimal] connections for the one or more *wireless* devices in the wireless docking group.

8. The apparatus of claim 7, wherein the information is communicated using a docking protocol.

9. The apparatus of claim 7, which further comprises:

the at least one memory and the computer program code configured to, with the at least one processor, cause the apparatus at least to:

join an infrastructure network having an access point, using a first protocol stack and form a peer-to-peer connection with the dockee device, using a second protocol stack.

10. The apparatus of claim 7, which further comprises: the at least one memory and the computer program code configured to, with the at least one processor, cause the apparatus at least to: form direct connections with at least one of the one or more *wireless* devices, based on the defined [optimal] connections.

11. The apparatus of claim 7, wherein the *wireless* communication link with the dockee device is a Wi-Fi direct network.

12. The apparatus of claim 7, wherein the *wireless* communication link with the dockee device is a Tunneled Direct Link Setup connection.

13. A computer program product comprising computer executable program code recorded on a computer readable, non-transitory storage medium, the computer executable program code, when executed by a computer processor, comprising:

code for forming a *wireless* communication link between a wireless docking station and a dockee device;

code for receiving, by the *wireless* docking station, from the dockee device *through the wireless communication link*, information about (*i*) the dockee device's capabilities and (*ii*) characteristics of one or more wireless devices within a wireless docking group, *the dockee device different from the one or more wireless devices*;

code for defining, by the *wireless* docking station, one or more [optimal] connections for *the* one or more [of the] wireless devices in the wireless docking group, based on the received information; and code for transmitting, by the *wireless* docking station, to the dockee device *through the wireless communication link*, information to enable formation of the one or more [optimal] connections for the one or more *wireless* devices in the wireless docking group.

14. A method, comprising:

forming a *wireless* communication link between a wireless docking station and a dockee device;

transmitting, by the dockee device to the *wireless* docking station *through the wireless communication link*, information about (*i*) the dockee device's capabilities and (*ii*) characteristics of one or more wireless devices within a wireless docking group, *the dockee device different from the one or more wireless devices*; and receiving, by the dockee device from the *wireless* docking station *through the wireless communication link*, information to enable formation of [the] one or more [optimal] connections for the one or more *wireless* devices in the wireless docking group.

15. The method of claim 14, wherein the information *about* (*i*) *the dockee device's capabilities and* (*ii*) *the characteristics of the one or more wireless devices* is communicated using a docking protocol.

16. The method of claim 14, further comprising:

forming, by the dockee device, one or more wireless connections with one or more other devices based on the received information.

17. An apparatus, comprising:

at least one processor; at least one memory including computer program code;

the at least one memory and the computer program code configured to, with the at least one processor, cause the apparatus at least to:

form a *wireless* communication link between the apparatus and a wireless docking station;

transmit to the *wireless* docking station *through the wireless communication link*, information about (*i*) the apparatus' capabilities and (*ii*) characteristics of one or more wireless devices within a wireless docking group, *the apparatus different from the one or more wireless devices*; and receive from the *wireless* docking station *through the wireless communication link*, information to enable formation of the one or more [optimal] connections for the one or more *wireless* devices in the wireless docking group.

18. The apparatus of claim 17, wherein the information *about* (*i*) *the apparatus' capabilities and* (*ii*) *the characteristics of the one or more wireless devices* is communicated using a docking protocol.

19. The apparatus of claim 17, further comprising:

the at least one memory and the computer program code configured to, with the at least one processor, cause the apparatus at least to:

form one or more wireless connections with one or more other devices based on the received information.

20. A computer program product comprising computer executable program code recorded on a computer readable, non-transitory storage medium, the computer executable program code, when executed by a computer processor, comprising:

code for forming a *wireless* communication link between a wireless docking station and a dockee device;

code for transmitting, by the dockee device to the *wireless* docking station *through the wireless communication link*, information about (*i*) the dockee device's capabilities and (*ii*) characteristics of one or more wireless devices within a wireless docking group, *the dockee device different from the one or more wireless devices*; and code for receiving, by the dockee device from the *wireless* docking station *through the wireless communication link*, information to enable formation of [the] one or more [optimal] connections for the one or more *wireless* devices in the wireless docking group.

*21. A method comprising:*

*receiving, by a wireless docking station, from a dockee device through a wireless communication link, information about* (*i*) *dockee device capabilities and* (*ii*) *characteristics of one or more wireless devices within a wireless docking group, the one or more wireless devices different from the dockee device;*

*defining, by the wireless docking station, one or more connections for the one or more wireless devices in the wireless docking group, based on the received information; and*

*transmitting, by the wireless docking station, to the dockee device through the wireless communication link, information to enable formation of the one or more connections for the one or more wireless devices in the wireless docking group.*

*22. The method of claim 21, wherein defining, by the wireless docking station, the one or more connections is based on a number of protocol stacks the dockee device has.*

*23. The method of claim 22, wherein defining, by the wireless docking station, the one or more connections is further based on whether the one or more wireless devices in the wireless docking group are directly coupled to the dockee device or directly coupled to an access point of a network.*

* * * * *